(12) United States Patent
Liu et al.

(10) Patent No.: US 9,736,731 B1
(45) Date of Patent: Aug. 15, 2017

(54) METHOD AND APPARATUS FOR FACILITATING TRANSMISSION OF LARGE FRAMES

(71) Applicant: Marvell International Ltd., Hamilton (BM)

(72) Inventors: Yong Liu, Campbell, CA (US); Raja Banerjea, Sunnyvale, CA (US); Hongyuan Zhang, Fremont, CA (US); Harish Ramamurthy, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 170 days.

(21) Appl. No.: 14/537,457

(22) Filed: Nov. 10, 2014

Related U.S. Application Data

(62) Division of application No. 12/869,733, filed on Aug. 26, 2010, now Pat. No. 8,885,495.

(60) Provisional application No. 61/367,221, filed on Jul. 23, 2010, provisional application No. 61/361,277, filed on Jul. 2, 2010, provisional application No. 61/286,550, filed on Dec. 15, 2009, provisional application No. 61/238,026, filed on Aug. 28, 2009.

(51) Int. Cl.
*H04W 28/18* (2009.01)

(52) U.S. Cl.
CPC .................................. *H04W 28/18* (2013.01)

(58) Field of Classification Search
None
See application file for complete search history.

(56) References Cited

U.S. PATENT DOCUMENTS

| 7,275,093 | B1 | 9/2007 | Freed et al. | |
|---|---|---|---|---|
| 2003/0169769 | A1 | 9/2003 | Ho et al. | |
| 2005/0265302 | A1* | 12/2005 | Nishibayashi | H04L 45/00 370/349 |
| 2006/0018268 | A1 | 1/2006 | Kakani et al. | |
| 2006/0187964 | A1 | 8/2006 | Li et al. | |
| 2008/0049654 | A1 | 2/2008 | Otal et al. | |
| 2009/0109944 | A1 | 4/2009 | Kwon et al. | |

(Continued)

OTHER PUBLICATIONS

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

(Continued)

*Primary Examiner* — Christine Duong

(57) ABSTRACT

A desired number of buffers to be used in a block acknowledgment (BA) session or with media access control (MAC) data units having a same traffic identifier (TID) is determined. A desired maximum MAC data unit size to be used in the BA session or with the MAC data units having the same TID is determined. An indication of the desired number of buffers in the BA session or with the MAC data units having the same TID is transmitted to a communication device in a wireless communication network for negotiating with the communication device. An indication of the desired maximum MAC data unit size to be used in the BA session or with the MAC data units having the same TID is transmitted to the second communication device for negotiating with the other station.

16 Claims, 35 Drawing Sheets

(56) References Cited

U.S. PATENT DOCUMENTS

| | | | |
|---|---|---|---|
| 2009/0228619 A1* | 9/2009 | Trainin | H04L 1/1621 710/56 |
| 2010/0260114 A1 | 10/2010 | Vermani et al. | |
| 2010/0271963 A1 | 10/2010 | Koorapaty et al. | |
| 2010/0315999 A1* | 12/2010 | Kakani | H04L 1/1614 370/328 |

OTHER PUBLICATIONS

IEEE Std 802.16e-2005 and IEEE Std 802.16-2004/Cor 1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, 864 pages (Feb. 28, 2006).

* cited by examiner

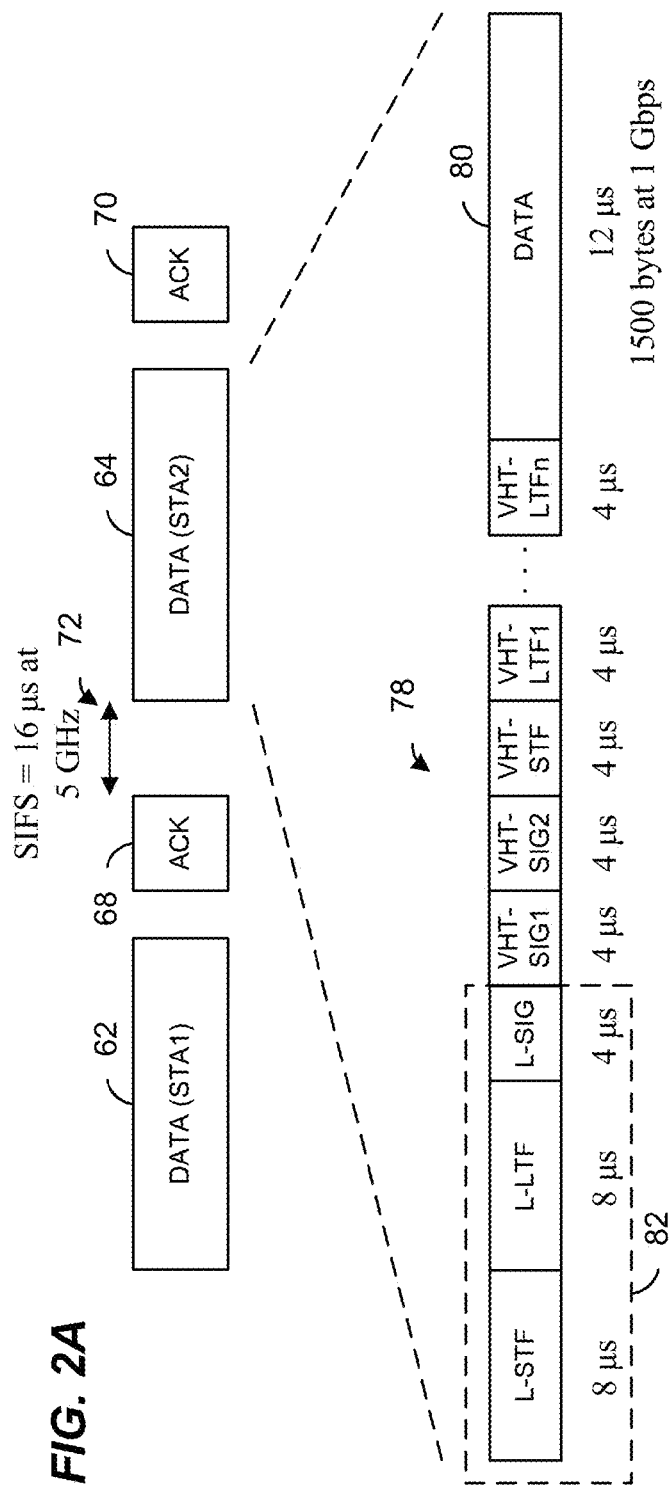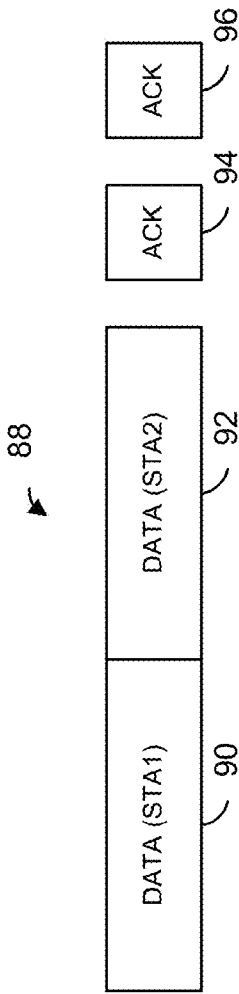

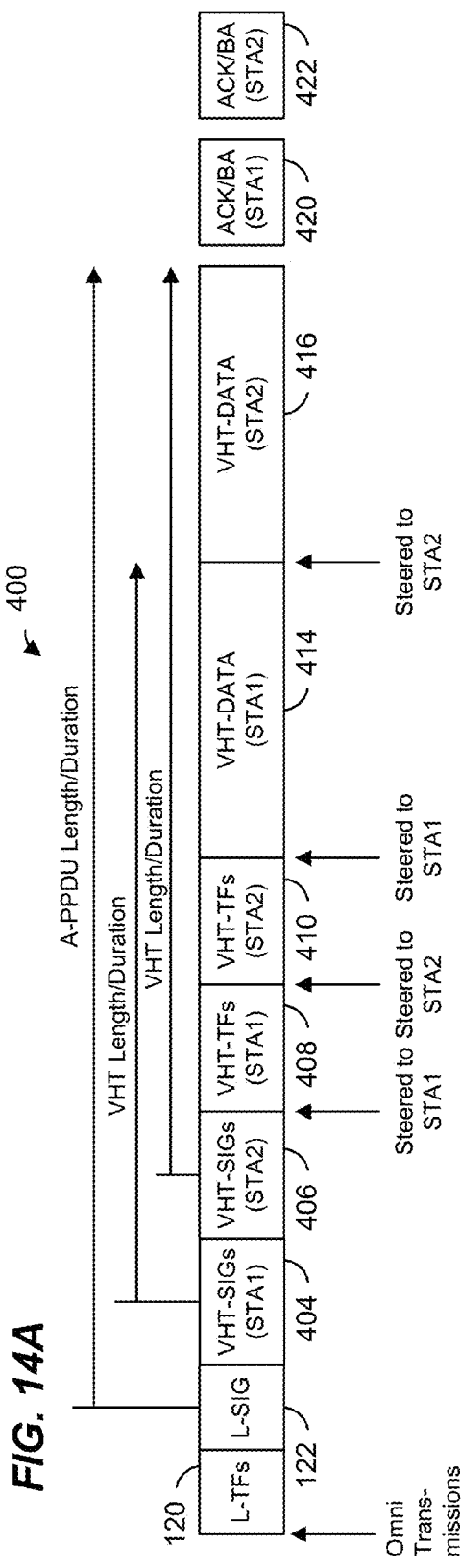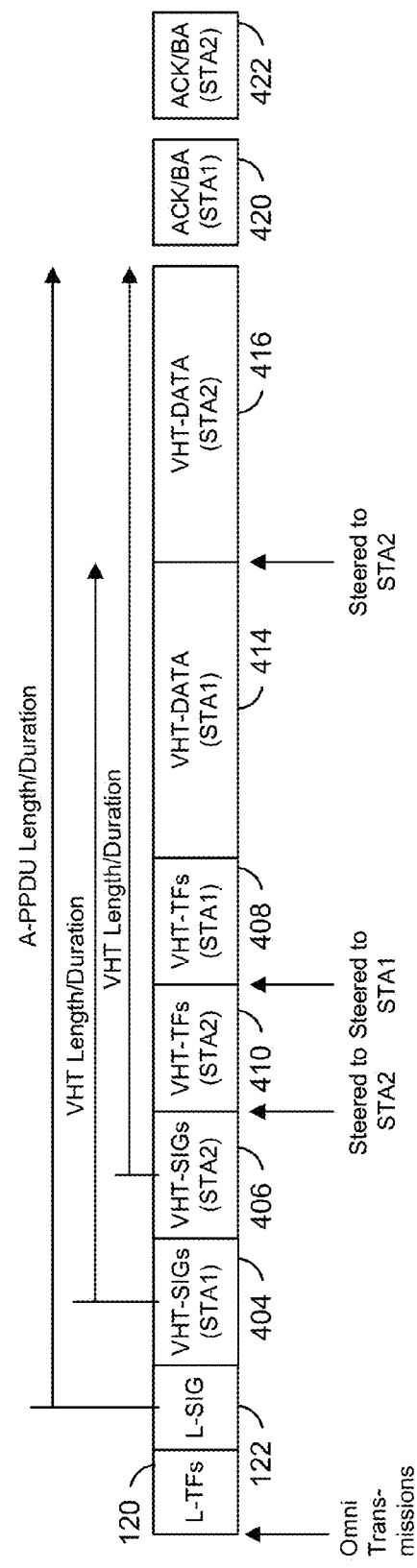

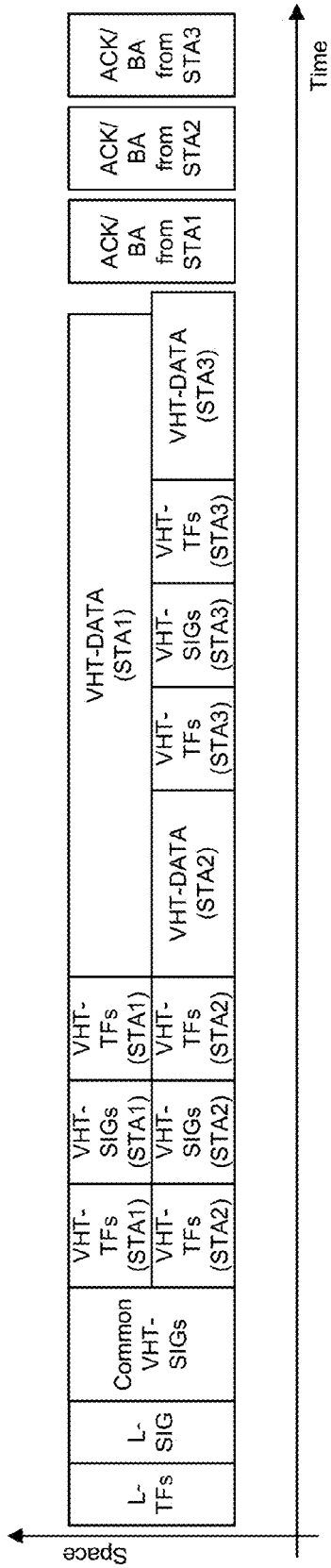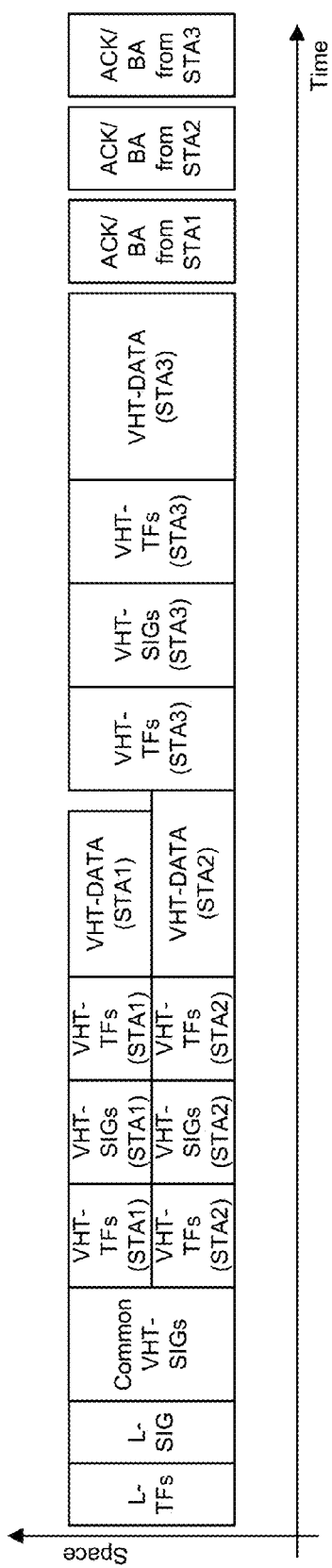
FIG. 26A
FIG. 26B

METHOD AND APPARATUS FOR FACILITATING TRANSMISSION OF LARGE FRAMES

CROSS-REFERENCES TO RELATED APPLICATIONS

The present application is a divisional application of U.S. application Ser. No. 12/869,733, filed Aug. 26, 2010, entitled Method and Apparatus for Facilitating Transmission of Large Frames," which claims the benefit of the following patent applications: U.S. Provisional Application No. 61/238,026, entitled "MULTI-USER FRAME AGGREGATION," which was filed on Aug. 28, 2009; U.S. Provisional Application No. 61/286,550, entitled "MULTI-USER FRAME AGGREGATION," which was filed on Dec. 15, 2009; U.S. Provisional Application No. 61/361,277, entitled "Jumbo VHT Frames," which was filed on Jul. 2, 2010; and U.S. Provisional Application No. 61/367,221, entitled "Jumbo VHT Frames," which was filed on Jul. 23, 2010. The entire disclosures of all of the applications referenced above are hereby incorporated by reference herein in their entireties.

The present application is also related to the following patent applications: U.S. patent application Ser. No. 12/869,491, entitled "METHOD AND APPARATUS FOR MULTI-USER FRAME AGGREGATION," filed on Aug. 26, 2010, which is hereby incorporated by reference herein in its entirety; U.S. patent application Ser. No. 12/869,503, entitled "METHOD AND APPARATUS FOR FACILITATING TRANSMISSION OF LARGE FRAMES," filed on Aug. 26, 2010, which is hereby incorporated by reference herein in its entirety.

FIELD OF TECHNOLOGY

The present disclosure relates generally to communication systems and, more particularly, to wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput

SUMMARY

In one embodiment, a method includes determining a minimum modulation and coding scheme (MCS) based on a physical layer (PHY) data unit size or media access control layer (MAC) data unit size, and causing data units to be transmitted according to an MCS that is equal to or exceeds the minimum MCS.

In another embodiment, an apparatus comprises a physical layer (PHY) processing unit to determine a minimum modulation and coding scheme (MCS) based on a physical layer (PHY) data unit size or media access control layer (MAC) data unit size, determine whether a communication channel supports at least the minimum MCS, and cause PHY data units to be transmitted according to an MCS that is equal to or exceeds the minimum MCS.

In yet another embodiment, a method includes determining a desired number of buffers to be used in a block acknowledgment (BA) session or with media access control (MAC) data units having a same traffic identifier (TID), and determining a desired maximum MAC data unit size to be used in the BA session or with the MAC data units having the same TID. Also, the method includes causing an indication of the desired number of buffers in the BA session or with the MAC data units having the same TID to be transmitted to another station in a wireless communication network for negotiating with the other station, and causing an indication of the desired maximum MAC data unit size to be used in the BA session or with the MAC data units having the same TID to be transmitted to the other station for negotiating with the other station.

In still another embodiment, an apparatus comprises a media access control (MAC) processing unit to determine a desired number of buffers to be used in a block acknowledgment (BA) session or with MAC data units having a same traffic identifier (TID), and to determine a desired maximum MAC data unit size to be used in the BA session or with the data units having the same TID. Additionally, the MAC processing unit is configured to cause an indication of the desired number of buffers in the BA session or with the MAC data units having the same TID to be transmitted to another station in a wireless communication network for negotiating with the other station, and cause an indication of the desired maximum MAC data unit size to be used in the BA session or with the MAC data units having the same TID to be transmitted to the other station for negotiating with the other station.

BRIEF DESCRIPTION OF THE DRAWINGS

FIG. 2A is a diagram of two separate PHY data units transmitted by an AP to two different client stations, according to an embodiment.

FIG. 2B is a diagram of a single PHY data unit that aggregates and includes independent data for two different client stations, according to an embodiment.

FIG. 14A is a diagram of another example aggregated PHY data unit that aggregates and includes independent data for a plurality of different client stations, according to another embodiment.

FIG. 14B is a diagram of another example aggregated PHY data unit that aggregates and includes independent data for a plurality of different client stations, according to another embodiment.

FIGS. 26A and 26B are diagrams of other example aggregated PHY data units that aggregate and include independent data for a plurality of different client stations, according to other embodiments.

DETAILED DESCRIPTION

In embodiments described below, wireless network devices such as an access point (AP) and client devices of a wireless local area network (WLAN) transmit data streams between the AP and the client devices. To enhance overall throughput, the AP aggregates independent data intended for a plurality of respective client devices into a single physical layer (PHY) data unit, in some embodiments. In other embodiments, the AP and/or a client device utilize enhancements to enable transmission of large data units, such as PHY data units or media access control (MAC) data units. As one example, an AP transmits a single PHY data unit that includes one or more midambles in addition to a preamble, in some embodiments. As another example, in other embodiments, a minimum modulation coding scheme by which to transmit a data unit is determined based on a size of the data unit. In another embodiment, devices negotiate a maximum PHY data unit size to be used, for example, for a particular traffic category, for a particular traffic stream, for a block acknowledgment (BA) session, etc.

Figure 1:
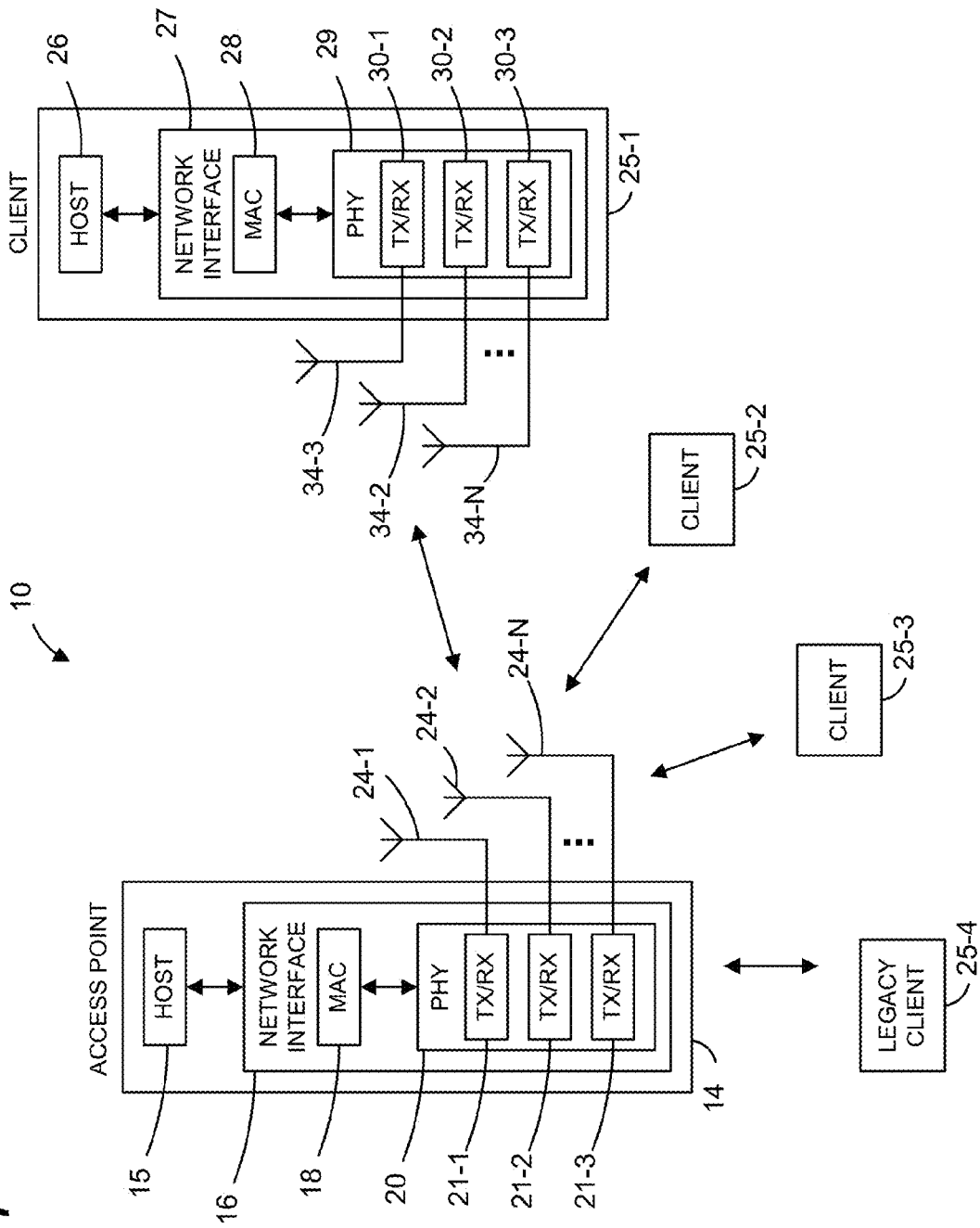
FIG. 1 a block diagram of an example wireless local area network (WLAN) communication system in which an access point (AP) transmits information to a plurality of client stations using aggregated physical layer (PHY) data units, according to an embodiment.

FIG. 1 is a block diagram of an example WLAN 10 in which devices such as an AP 14 and client devices 25 exchange information using OFDM (Orthogonal Frequency-Division Multiplexing) techniques in a MIMO mode, according to an embodiment. The AP 14 includes a host processor 15 coupled to a network interface 16. The network interface 16 includes a medium access control (MAC) processing unit 18 and a physical layer processing unit 20. The PHY processing unit 20 includes a plurality of transceivers 21, and the transceivers are coupled to N antennas 24. In FIG. 1, the AP has the same number of transceivers 21 as antennas 24, but in other embodiments, the AP 14 includes different numbers of transceivers 21 and antennas 24. In FIG. 1, three transceivers 21 and three antennas 24 are illustrated, but in other embodiments, the AP 14 includes different numbers of transceivers 21 and antennas 24. (e.g., 1, 2, 4, 5, 6, 8, etc.) In one embodiment, the MAC processing unit 18 and the PHY processing unit 20 are configured to operate according to a communication protocol generally similar to the IEEE 802.11ac Standard (now in the process of being standardized), for example. Additionally, in some embodiments, the PHY processing unit 20 is configured to aggregate independent data intended for a plurality of respective client devices into a single PHY data unit. In other embodiments, the MAC processing unit 18 and/or the PHY processing unit 20 are configured to utilize enhancements to enable transmission of large data units. In other embodiments, the MAC processing unit 18 and/or the PHY processing unit 20 are configured to operate according to another communication protocol different than the IEEE 802.11ac Standard, but that supports or specifies to aggregate independent data intended for a plurality of respective client devices into a single PHY data unit and/or enhancements to enable transmission of large data units. Hereinafter, for convenience, a communication protocol that supports or specifies aggregating independent data intended for a plurality of respective client devices into a single PHY data unit and/or enhancements to enable transmission of large data units is referred to herein as a "very high throughput protocol" or a "VHT protocol."

In another embodiment, the MAC processing unit 18 and the PHY processing unit 20 are also configured to operate according to communication protocols such as the IEEE 802.11n Standard and/or the IEEE 802.11a Standard in addition to the VHT protocol. The IEEE 802.11a Standard is referred to herein as a "legacy protocol," and the IEEE 802.11n Standard is referred to herein a "high throughput protocol," or an" "HT protocol," which is also a legacy protocol. In other words, the IEEE 802.11a and the IEEE 802.11n Standards are examples of "legacy protocols," as that term is used herein.

A client device 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although the same number of transceivers 30 and antennas 34 are illustrated in FIG. 1, the client device 25-1 includes different numbers of transceivers 30 and antennas 34, in other embodiments. Although three transceivers 30 and three antennas 34 are illustrated in FIG. 1, the client device 25-1 includes different numbers (e.g., 1, 2, 4, 5, etc.) of transceivers 30 and antennas 34 in other embodiments. The transceiver(s) 30 is/are configured to transmit generated data units via the antenna(s) 34. Similarly, the transceiver(s) 30 is/are configured to receive data units via the antenna(s) 34. The PHY processing unit 29 of the client device 25-1 is configured to process received data units conforming to the VHT protocol and to generate data units conforming to the VHT protocol for transmission, according to various embodiments.

In an embodiment, one or both of the client devices 25-2 and 25-3 has a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the VHT protocol. Similarly, according to an embodiment, the legacy client station 25-4 is not enabled to transmit data units according to the VHT protocol. On the other hand, the legacy client station 25-4 is enabled to receive and fully decode and transmit data units according to one or several legacy protocols.

FIG. 2A is a diagram of two separate PHY data units 62, 64 transmitted by an AP to two different client stations (STA1, STA2), according to an embodiment. Each of STA1 and STA2 responds with a respective acknowledgment 68, 70. The acknowledgement 68 transmitted by STA1 and the beginning of the PHY data unit 64 to STA2 are separated by at least a short interframe space (SIFS) 72. In one embodiment, the SIFS 72 has a duration of 16 µs in a 5 GHz channel.

The data unit 64 is designed for mixed mode situations, i.e., when a WLAN includes one or more client stations that conform to a legacy protocol but not to the VHT protocol. The PHY data unit 64 includes a PHY preamble 78 and a payload 80. The PHY preamble 78 includes a portion 82 having a legacy short training field (L-STF), a legacy long training field (L-LTF) and a legacy signal field (L-SIG). L-STF is used by a receiver for packet detection, automatic gain control (AGC), synchronization, etc., L-LTF is used by the receiver for channel estimation and fine synchronization. The transmitter uses L-SIG to signal basic PHY parameters to receiving devices. The portion 82 is capable of being received and correctly decoded/interpreted by legacy devices, even if the other portions of the PHY data unit 64 (e.g., the payload 80) cannot be received and/or correctly decoded by the legacy devices. Thus, for example, a legacy device can at least determine the length/duration of the PHY data unit 64 using information included in L-SIG, for example. This allows a legacy station to wait until the data unit 64 ends before attempting to transmit, for example.

The PHY preamble 78 also includes HT and/or VHT portions such as one or more VHT signal fields (VHT-SIGs), a VHT short training field (VHT-STF), and one or more VHT long training fields (VHT-LTFs), etc. The HT and/or VHT portions of the PHY preamble 78 permits HT and/or VHT stations to detect, synchronize to, etc., HT and/or VHT transmissions.

In one embodiment, each of the L-STF and the L-LTF has a duration of 8 µs, and the L-SIG has a duration of 4 µs. In one example scenario, the portion 82 has a duration of 20 µs, and payload 80 has a duration of 12 µs with 1500 bytes at a rate of 1 gigabit per second (Gbps). Thus, in some scenarios, the portion 82 of the preamble 78 has a duration that is significant when compared to the duration of the payload 80.

The data unit 62 has a format similar to the format of the data unit 64, in one embodiment.

FIG. 2B is a diagram of a single PHY data unit 88 that aggregates and includes independent data for two different client stations (STA1, STA2). The single PHY data unit 88 is transmitted by the AP, in one embodiment. The PHY data unit 88 includes the payload information of the two separate PHY data units 62, 64 of FIG. 2A, but only some of the PHY preamble information of the two separate PHY data units 62, 64, according to an embodiment. The data unit 88 includes a portion 90 corresponding to data for STA1 and a portion 92 corresponding to data for STA2. Each of STA1 and STA2 responds to the single PHY data unit 88 with a respective acknowledgment 94, 96.

The portion 90 generally corresponds to the PHY data unit 62 of FIG. 2A, and the portion 92 generally corresponds to the PHY data unit 64 of FIG. 2A. The portion 92, however, omits the portion 82 (FIG. 2A), however. Thus, the portion 92 is at least 20 µs shorter than the data unit 64, in one scenario. Additionally, comparing FIGS. 2A and 2B, the PHY data unit 88 is contiguous with no SIFS 72 between the portions 92, 94. Thus, the PHY data unit 88 has a duration at least 36 µs less than the cumulative duration of the PHY data units 62, 64 and the SIFS 72. In an at least some scenarios, this provides a significant overhead reduction as compared to the scenario of FIG. 2A.

Figure 3:
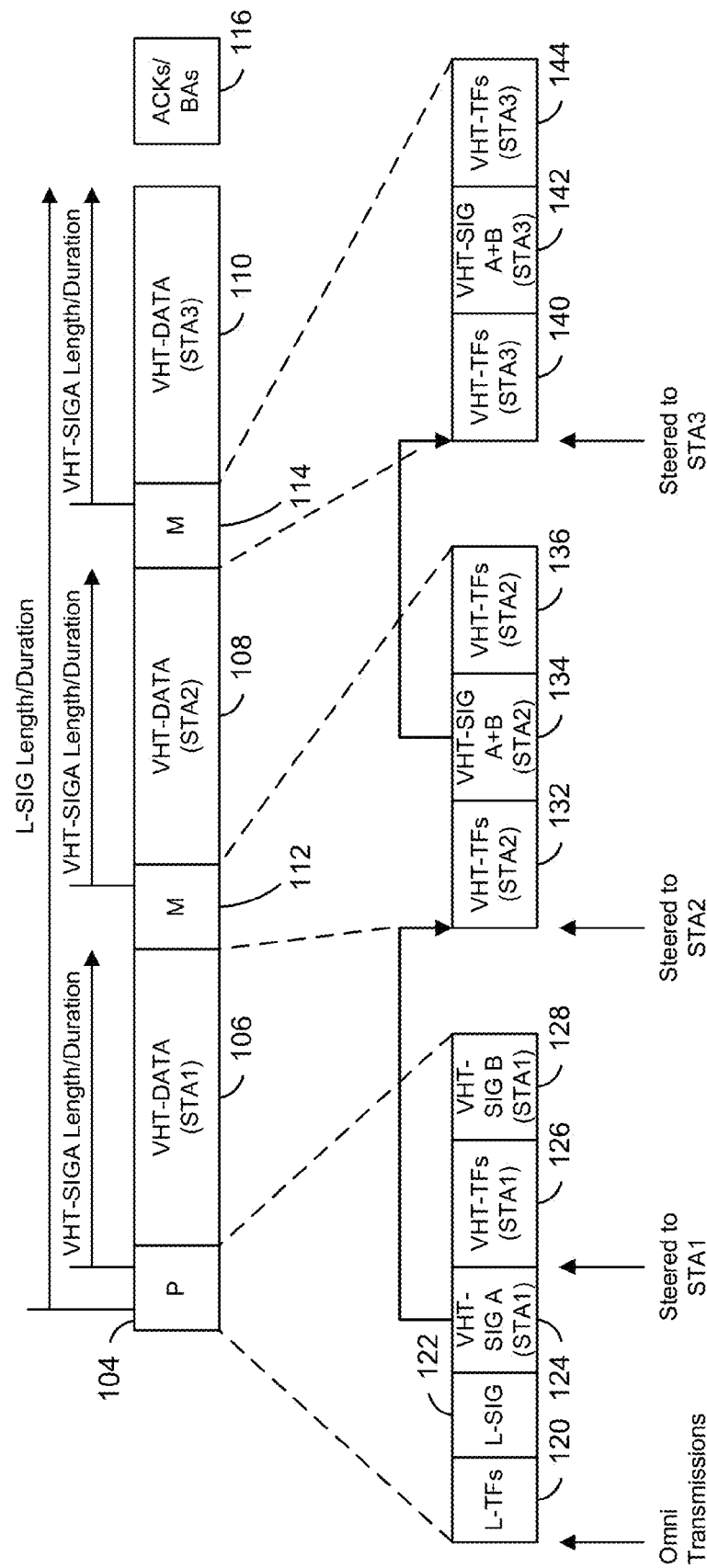
FIG. 3 is a diagram of an example single PHY data unit that aggregates and includes independent data for a plurality of different client stations, according to an embodiment.

FIG. 3 is a diagram of an example single PHY data unit 100 that aggregates and includes independent data for a plurality of different client stations (e.g., STA1, STA2, STA3), according to an embodiment. Single PHY data units that aggregate independent data for a plurality of different stations are referred to herein as aggregated PHY data units. The aggregated PHY data unit 100 includes a preamble 104 and payloads 106, 108, 110 corresponding to STA1, STA2, and STA3, respectively. The payloads 106, 108, 110 are separated by midambles 112, 114. The preamble 104, the payloads 106, 108, 110, and the midambles 112, 114 form the single integrated PHY data unit 100. In response to the aggregated PHY data unit 100, STA1, STA2, and STA3 transmit acknowledgements 116. If the aggregated PHY data unit 100 is part of a block acknowledgment (BA) session, the acknowledgments transmitted by STA1, STA2, and STA3 are transmitted in response to a plurality of aggregated PHY data units including the aggregated PHY data unit 100.

The aggregated PHY data unit 100 is utilized by an AP that performs different beamforming (or beamsteering) to STA1, STA2, and STA3, according to one embodiment. For example, the payload 106 is steered to STA1, the payload 108 is steered to STA2, and the payload 110 is steered to STA3.

The preamble 104 includes one or more legacy training fields (L-TFs) 120 such as an L-STF, an L-LTF, etc., and an L-SIG 122. The preamble 104 also includes a first VHT-SIG field 124 (VHT-SIGA (STA1)) corresponding to STA1, and one or more VHT training fields (VHT-TFs) 126 such as a VHT-STF, a VHT-LTF, etc. In one embodiment, the preamble 104 also includes a second VHT-SIG field 128 (VHT-SIGB (STA1)) corresponding to STA1. In another embodiment, the VHT-SIGB (STA1) 128 is omitted. In some embodiments in which the VHT-SIGB (STA1) 128 is omitted, the VHT-SIGA (STA1) 124 may be referred to merely as the VHT-SIG (STA1) 124.

The L-TFs 120, the L-SIG 122, and the VHT-SIGA (STA1) 124 are transmitted in an omnidirectional or quasi-omnidirectional (hereinafter merely referred to as "omnidirectional" for convenience) manner to improve chances that all stations, including STA1, STA2, STA3, and any legacy stations, receive at least the L-TFs 120 and the L-SIG 122, in at least some scenarios. It also improves the chances that the VHT-SIGA (STA1) 124 is received by STA2 and STA3, in at least some scenarios. The L-SIG 122 includes length and/or duration information that enables a receiving station (STA1, STA2, STA3, a legacy station, etc.) to determine the length of the aggregated PHY data unit 100. The VHT-SIGA (STA1) 124 includes an indication of whether a midamble and another payload follow the payload 106. The VHT-SIGA (STA1) 124 includes length and/or duration information that indicates the length/duration of the payload 106, or the payload 106 and at least a portion of the preamble 104 and thus enables a VHT receiving station (e.g., STA1, STA2, STA3) to determine the length/duration of the payload 106 or the payload 106 and/or at least the portion of the preamble 104. The length and/or duration information in the VHT-SIGA (STA1) 124 also indicates a start of the midamble 112, and thus enables a VHT receiving station (e.g., STA1, STA2, STA3) to determine a start of the midamble 112. The VHT-TFs 126, the VHT-SIGB (STA1) 128, and the payload 106 are steered to STA1 (i.e., the transmitting device applies a steering vector or matrix).

The midamble 112 includes one or more first VHT-TFs 132 and one or more VHT-SIG fields 134 (VHT-SIGA+B (STA2)) corresponding to STA2. In one embodiment, the midamble 112 includes one or more second VHT-TFs 136. In another embodiment, the second VHT-TFs 136 are omitted. The VHT-SIGA+B (STA2) 134 includes an indication of whether a midamble and another payload follow the payload 108. The VHT-SIGA+B (STA2) 134 includes length and/or duration information that indicates the length/duration of the payload 108, or the payload 108 and at least a portion of the midamble 112 and thus enables a VHT receiving station (e.g., STA1, STA2, STA3) to determine the length/duration of the payload 108 or the payload 108 and/or at least the portion of the midamble 112. The length and/or duration information in the VHT-SIGA+B (STA2) 134 also indicates a start of the midamble 114, and thus enables a VHT receiving station (e.g., STA1, STA2, STA3) to determine a start of the midamble 114. The VHT-TFs 132, the VHT-SIGA+B (STA2) 134, the VHT-TFs 136, and the payload 108 are steered to STA2.

The midamble 114 includes one or more first VHT-TFs 140 and one or more VHT-SIG fields 142 (VHT-SIGA+B (STA3)) corresponding to STA3. In one embodiment, the midamble 114 includes one or more second VHT-TFs 144. In another embodiment, the second VHT-TFs 144 are omitted. The VHT-SIGA+B (STA3) 142 includes an indication of whether a midamble and another payload follow the payload 110. The VHT-SIGA+B (STA3) 142 includes length and/or duration information that indicates the length/duration of the payload 110, or the payload 110 and at least a portion of the midamble 142 and thus enables a VHT receiving station (e.g., STA1, STA2, STA3) to determine the length/duration of the payload 110 or the payload 110 and/or at least the portion of the midamble 114. When the payload 110 is the last payload of the aggregated PHY data unit 100, the length and/or duration information in the VHT-SIGA+B (STA3) 142 also indicates the end of the aggregated PHY data unit 100. The VHT-TFs 140, the VHT-SIGA+B (STA3) 142, the VHT-TFs 144, and the payload 110 are steered to STA3.

The preamble 104 and the payload 106 are referred to as an individual PHY data unit in the aggregated PHY data unit 100. Similarly, the midamble 112 and the payload 108 are referred to as an individual PHY data unit in the aggregated PHY data unit 100, and the midamble 114 and the payload 110 are referred to as an individual PHY data unit in the aggregated PHY data unit 100. The preamble 104 indicates whether the preamble 104 is part of an aggregated PHY data unit. Additionally, each of the midambles 112, 114 indicates whether another individual PHY data unit follows the individual PHY data unit to which the midamble belongs. Additionally, when an individual PHY data unit follows the individual PHY data unit to which a midamble belongs, the midamble indicates the start of the next individual PHY data unit (e.g., the start of the next midamble).

In one example, length and/or duration information includes an indication of the length of data and an indication of an MCS used to transmit the data, so that the duration can be determined using the length of data and the indication of the MCS.

Figure 4:
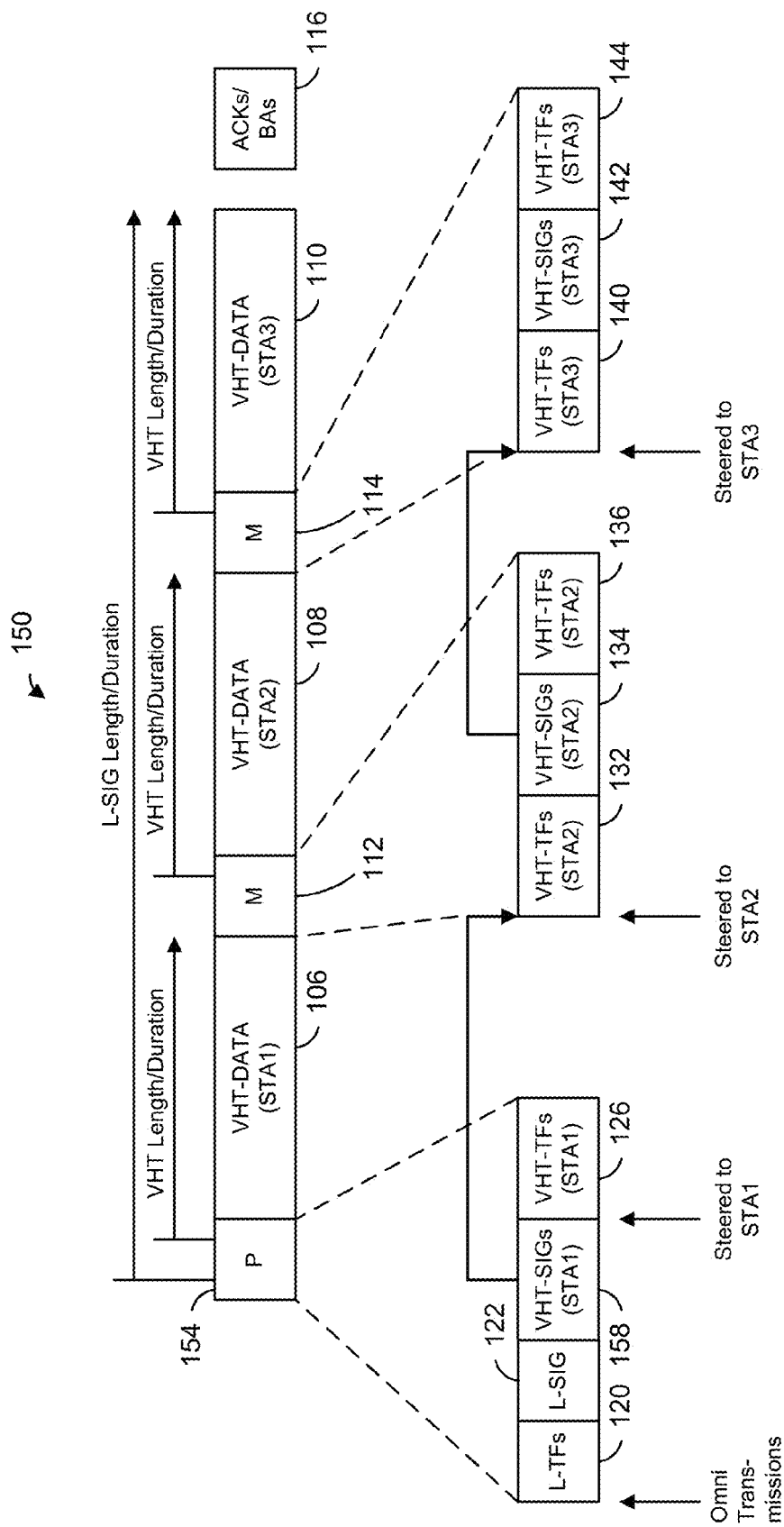
FIG. 4 is a diagram of another example aggregated PHY data unit that aggregates and includes independent data for a plurality of different client stations, according to another embodiment.

FIG. 4 is a diagram of another example aggregated PHY data unit 150 that aggregates and includes independent data for a plurality of different client stations (e.g., STA1, STA2, STA3), according to another embodiment. The aggregated PHY data unit 150 is similar to the aggregated PHY data unit 100 of FIG. 3, but has a preamble 154 that includes one or more VHT-SIG fields 158 (VHT-SIGs (STA1)) corresponding to STA1 prior to the VHT-TFs (STA1) 126, but omits any VHT-SIGs corresponding to STA1 after the VHT-TFs (STA1) 126.

Figure 5:
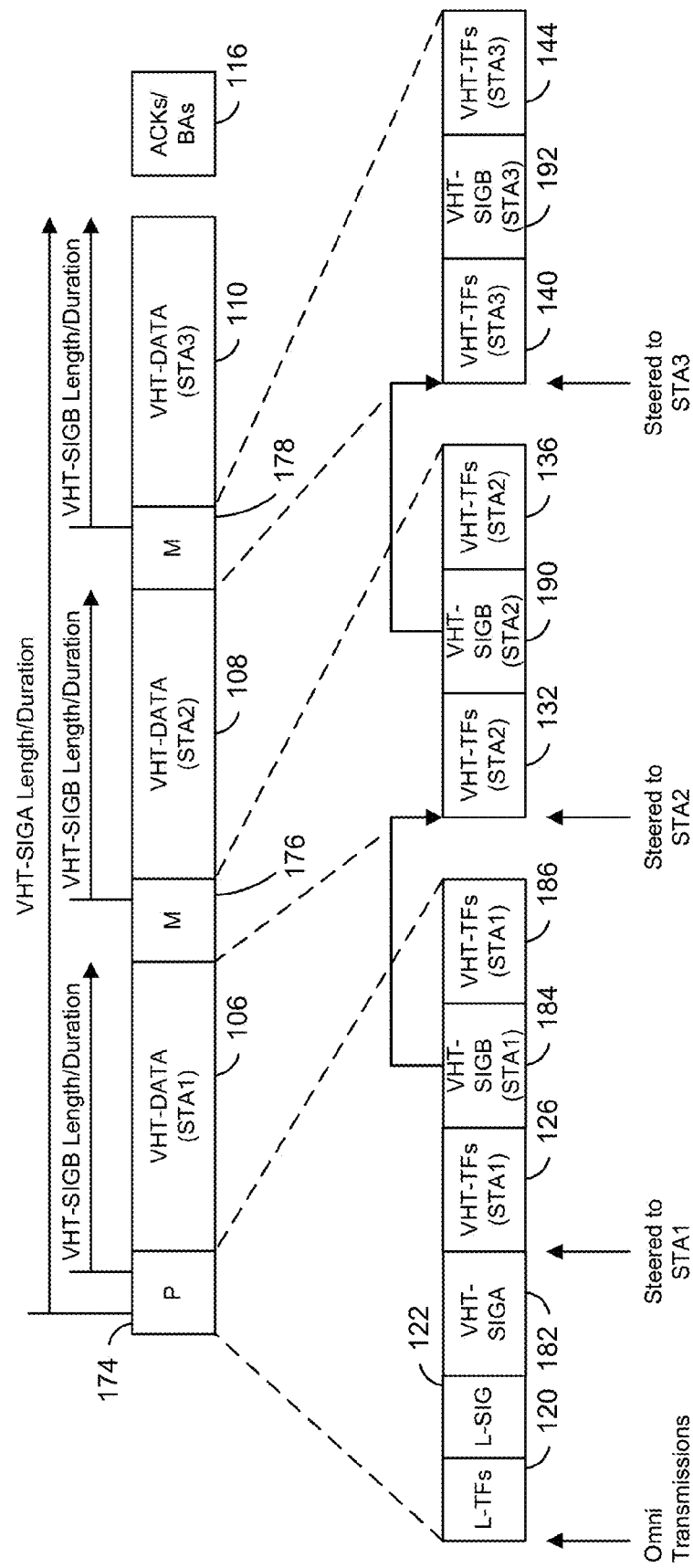
FIG. 5 is a diagram of another example aggregated PHY data unit that aggregates and includes independent data for a plurality of different client stations, according to another embodiment.

FIG. 5 is a diagram of another example aggregated PHY data unit 170 that aggregates and includes independent data for a plurality of different client stations (e.g., STA1, STA2, STA3), according to another embodiment. The aggregated PHY data unit 170 is similar to the aggregated PHY data unit 100 of FIG. 3, but has a preamble 174, a midamble 176, and a midamble 178.

The preamble 174 includes a VHT-SIGA 182 that includes information corresponding to STA1, STA2, STA3. For example, in one embodiment, the VHT-SIGA 174 includes information that indicates the length/duration of the aggregated PHY data unit 170. This may increase robustness, at least in some scenarios, as compared to the aggregated PHY data unit 100 of FIG. 3, in which the length/duration of the aggregated PHY data unit 100 is merely indicated in the L-SIG 122.

The preamble 174 also includes a VHT-SIG field 184 that corresponds to STA1 (VHT-SIGB (STA1)). VHT-SIGB (STA1) 184 includes an indication of whether another individual PHY data unit in the aggregated PHY data unit 170 follows the payload 106. The VHT-SIGB (STA1) 184 includes length and/or duration information that indicates the length/duration of the PHY data unit corresponding to the preamble 174 and thus enables a VHT receiving station (e.g., STA1, STA2, STA3) to determine the length/duration of the PHY data unit corresponding to the preamble 174. The length and/or duration information in the VHT-SIGB (STA1) 184 also indicates a start of the PHY data unit in the aggregated PHY data unit 170 corresponding to the midamble 176, and thus enables a VHT receiving station (e.g., STA1, STA2, STA3) to determine a start of the midamble 176. The preamble 174 also include second one or more VHT-TFs (STA1) 186, in one embodiment. In another embodiment, the second VHT-TFs (STA1) 186 are omitted.

The L-TFs 120, the L-SIG 122, and the VHT-SIGA (STA1) 182 are transmitted in an omnidirectional manner. The VHT-TFs 126, the VHT-SIGB (STA1) 1 184, the second one or more VHT-TFs (STA1) 186, and the payload 106 are steered to STA1.

The midamble 176 includes a VHT-SIG field 190 (VHT-SIGB (STA2)) corresponding to STA2. The VHT-SIGB (STA2) 190 includes an indication of whether another individual PHY data unit in the aggregated PHY data unit 170 follows the payload 108. The VHT-SIGB (STA2) 190 includes length and/or duration information that indicates the length/duration of the PHY data unit corresponding to the midamble 176 and thus enables a VHT receiving station (e.g., STA1, STA2, STA3) to determine the length/duration of the PHY data unit corresponding to the midamble 176. The length and/or duration information in the VHT-SIGB (STA2) 190 also indicates a start of the individual PHY data unit corresponding to the midamble 178, and thus enables a VHT receiving station (e.g., STA1, STA2, STA3) to determine a start of the midamble 178. The VHT-TFs 132, the VHT-SIGB (STA2) 190, the VHT-TFs 136, and the payload 108 are steered to STA2.

The midamble 178 includes a VHT-SIG field 192 (VHT-SIGB (STA3)) corresponding to STA3. The VHT-SIGB (STA3) 192 includes an indication of whether another individual PHY data unit follows the payload 110. The VHT-SIGB (STA3) 192 includes length and/or duration information that indicates the length/duration of the individual PHY data unit corresponding to the midamble 178 and thus enables a VHT receiving station (e.g., STA1, STA2, STA3) to determine the length/duration of the individual PHY data unit corresponding to the midamble 178. When the payload 110 is the last payload of the aggregated PHY data unit 170, the length and/or duration information in the VHT-SIGB (STA3) 192 also indicates the end of the aggregated PHY data unit 170. The VHT-TFs 140, the VHT-SIGB (STA3) 192, the VHT-TFs 144, and the payload 110 are steered to STA3.

Figure 6:
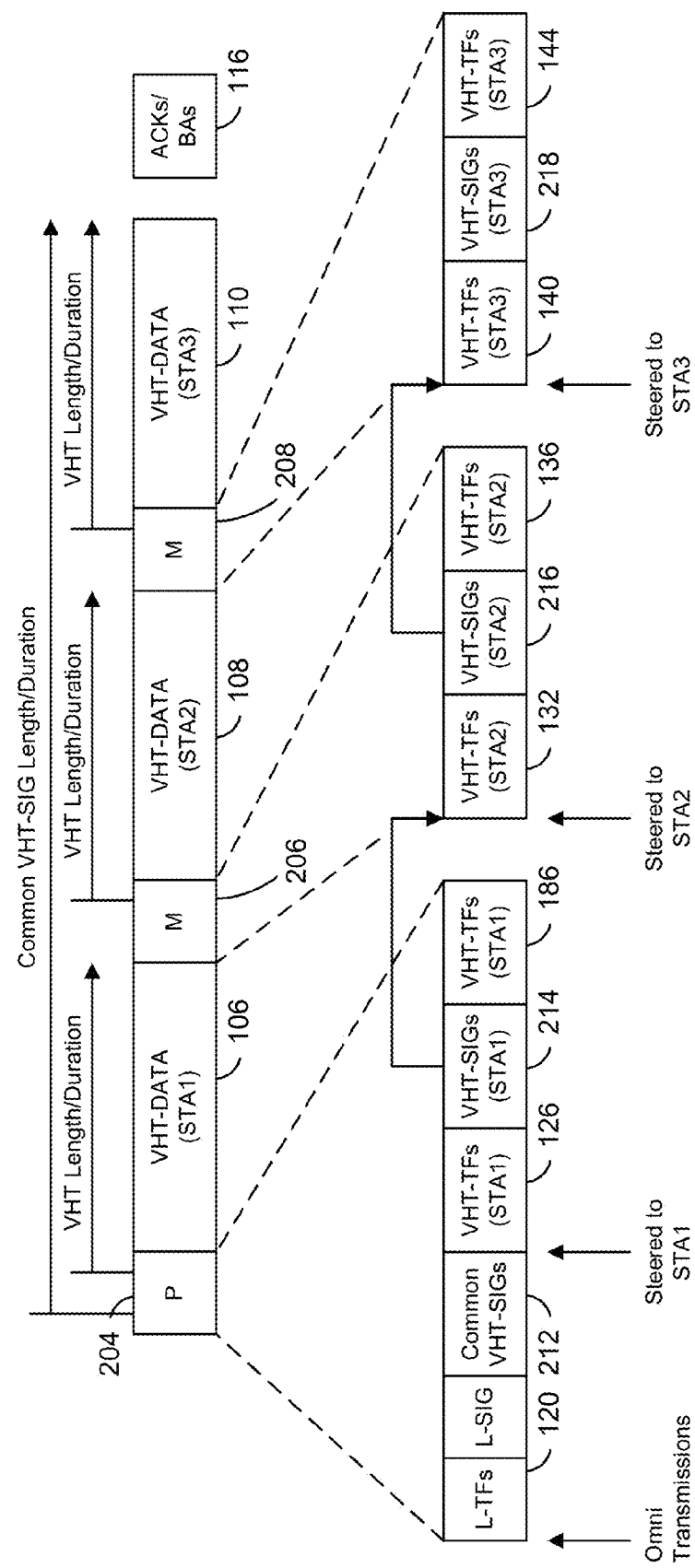
FIG. 6 is a diagram of another example aggregated PHY data unit that aggregates and includes independent data for a plurality of different client stations, according to another embodiment.

FIG. 6 is a diagram of another example aggregated PHY data unit 200 that aggregates and includes independent data for a plurality of different client stations (e.g., STA1, STA2, STA3), according to another embodiment. The aggregated PHY data unit 200 is similar to the aggregated PHY data unit 170 of FIG. 5, and includes a preamble 204, a midamble 206, and a midamble 208. The preamble 204 includes a common VHT-SIG 212 that includes information corresponding to STA1, STA2, STA3. For example, in one embodiment, the common VHT-SIG 212 includes information that indicates the length/duration of the aggregated PHY data unit 200. This may increase robustness, at least in some scenarios, as compared to the aggregated PHY data unit 100 of FIG. 3, in which the length/duration of the aggregated PHY data unit 100 is merely indicated in the L-SIG 122.

The midamble 206 includes one or more VHT-SIG fields 216 (VHT-SIGs (STA2)) corresponding to STA2. The VHT-SIGs (STA2) 216 include an indication of whether another individual PHY data unit in the aggregated PHY data unit 170 follows the payload 108. The VHT-SIGs (STA2) 216 include length and/or duration information that indicates the length/duration of the individual PHY data unit corresponding to the midamble 206 and thus enables a VHT receiving station (e.g., STA1, STA2, STA3) to determine the length/duration of the individual PHY data unit corresponding to the midamble 206. The length and/or duration information in the VHT-SIGs (STA2) 216 also indicate a start of the individual PHY data unit corresponding to the midamble 208, and thus enables a VHT receiving station (e.g., STA1, STA2, STA3) to determine a start of the midamble 208.

The midamble 208 includes one or more VHT-SIG fields 218 (VHT-SIGs (STA3)) corresponding to STA3. The VHT-SIGs (STA3) 218 include an indication of whether another individual PHY data unit follows the payload 110. The VHT-SIGs (STA3) 218 includes length and/or duration information that indicates the length/duration of the individual PHY data unit corresponding to the midamble 208 and thus enables a VHT receiving station (e.g., STA1, STA2, STA3) to determine the length/duration of the individual PHY data unit corresponding to the midamble 208. When the payload 110 is the last payload of the aggregated PHY data unit 200, the length and/or duration information in the VHT-SIGs (STA3) 218 also indicates the end of the aggregated PHY data unit 200.

In one embodiment, the common VHT-SIG 212 includes length/duration information for each individual PHY data unit in the aggregated PHY data unit 200. Because the common VHT-SIG 212 is transmitted in an omnidirectional manner, including length/duration information for each individual PHY data unit in the aggregated PHY data unit 200 helps to ensure that the length/duration information for each individual PHY data unit is conveyed to all of STA1, STA2, STA3. In another embodiment, the common VHT-SIG 212 includes acknowledge/block acknowledge/response (ACK/BA/response) scheduling information for all of STA1, STA2, STA3, or just STA2 and STA3. In other embodiments, the common VHT-SIG 212 includes other information common for all of STA1, STA2, STA3, such as an indication of a number of individual PHY data units in the aggregated PHY data unit, etc.

In the embodiments of FIGS. 3-6, at least some of the length/duration information that indicates a start of a next midamble is included in a VHT-SIG field that is steered to a particular station. Because of such steering, other stations may not properly receive the VHT-SIG field at least in some scenarios.

Figure 7:
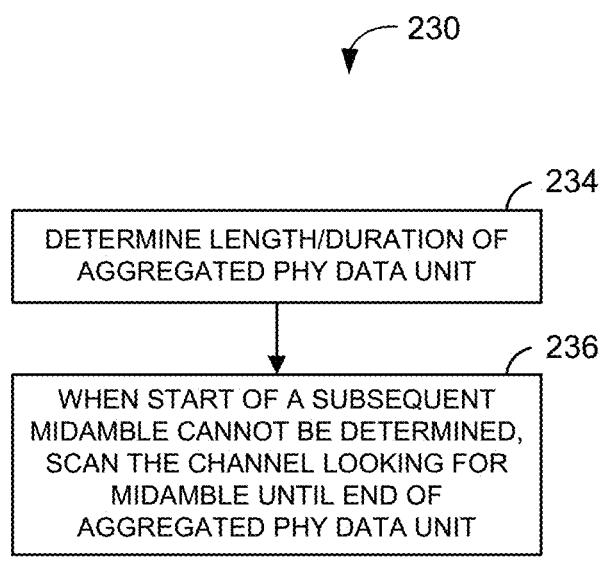
FIG. 7 is a flow diagram of an example method for processing an aggregated PHY data unit, such as one of the example aggregated PHY data units of FIGS. 3-6.

FIG. 7 is a flow diagram of an example method 230 for processing an aggregated PHY data unit, such as one of the example aggregated PHY data units of FIGS. 3-6. The method 230 is utilized when a start of a midamble in the aggregated PHY data unit cannot be determined. This may occur when the length/duration information of an individual PHY data unit in the aggregated PHY data unit cannot be determined because the length/duration information is in a transmission steered to another station, in some scenarios. This may additionally or alternatively occur when the length/duration information of an individual PHY data unit in the aggregated PHY data unit cannot be determined because of noise and/or interference, for example. The method 230 is implemented by a PHY processing unit of a receiver, such as the PHY processing unit 29 of FIG. 1, in one embodiment.

At block 234, a length/duration of the aggregated PHY data unit is determined. In one embodiment, the length/duration of the aggregated PHY data unit is determined using length, duration, and/or MCS information, in a preamble of the aggregated PHY data unit. For example, the length, duration, and/or MCS information is included in an L-SIG field of a preamble, in one embodiment. In another embodiment, the length, duration, and/or MCS information is additionally or alternatively included in a VHT-SIG field of the preamble.

At block 236, when a start of a subsequent midamble in the aggregated PHY data unit cannot be determined, the channel is scanned looking for a midamble. This channel scanning looking for a midamble continues until a midamble is found or until the end of the aggregated PHY data unit occurs. Being unable to determine a start of a subsequent midamble may occur when a VHT-SIG field of a preamble or a current midamble is not received correctly. Thus, block 236 includes determining that a field of a preamble or a current midamble that includes length/duration information for an individual PHY data unit in the aggregated PHY data unit (e.g., a VHT-SIG field) was not received correctly, in one embodiment.

In some embodiments, one or more signal fields in the preamble (e.g., a VHT-SIG field) that is/are transmitted in an omnidirectional manner include(s) one or more of a) an indication of a multi-user group identifier (ID) that indicates stations for which payload data is included in the aggregated PHY data unit; b) an indication of a number of individual PHY data units in the aggregated PHY data unit; and/or c) a sequence number/index for each station that indicates a relative position of the individual PHY data unit within the aggregated PHY data unit, where the individual PHY data unit corresponds to the station. As one example, in the embodiments of FIGS. 3-6, STA1 would have an index of one, STA2 would have an index of two, and STA3 would have an index of three. In some embodiments in which a relative position of the individual PHY data unit corresponding to the station is included, if the PHY data unit is not the first individual PHY data unit in the aggregated PHY data unit, the station stops receiving until the individual PHY data unit occurs. Similarly, in some embodiments in which a relative position of the individual PHY data unit corresponding to the station is included, if the individual PHY data unit is not the last individual PHY data unit in the aggregated PHY data unit, the station stops receiving after the individual PHY data unit occurs and for the remainder of the aggregated PHY data unit.

In some embodiments, a field that indicates a length duration of an individual PHY data unit and also includes an indication of the station for which the individual PHY data unit includes data. The indication of the station is an address, in one embodiment. In some embodiments, if a station determines that the individual PHY data unit includes data for the station, the station receives the remainder of the individual PHY data unit. On the other hand, if a station determines that the individual PHY data unit does not include data for the station, the station stops receiving the remainder of the individual PHY data unit and then resumes receiving at the start of the next individual PHY data unit, when appropriate.

Figure 8:
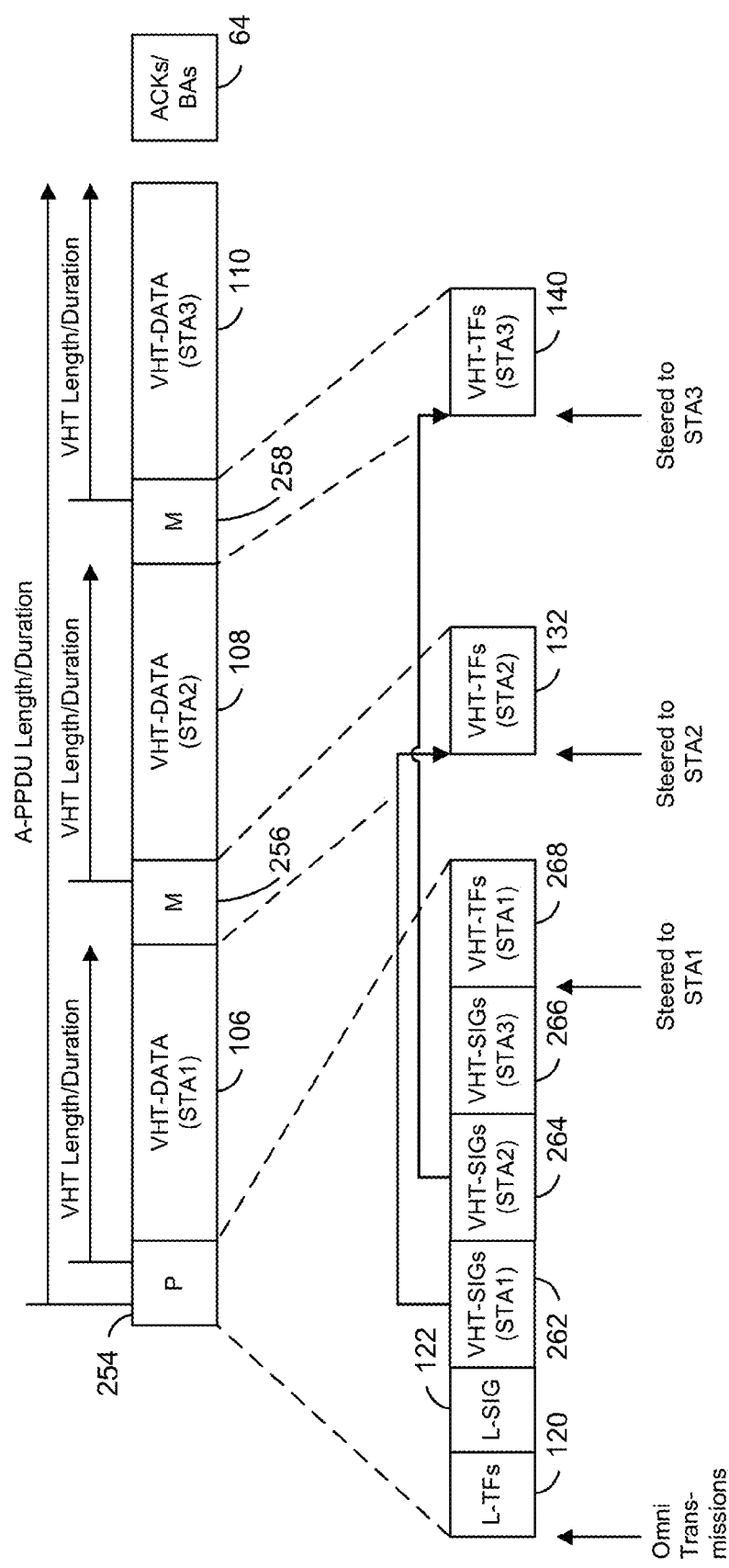
FIG. 8 is a diagram of another example aggregated PHY data unit that aggregates and includes independent data for a plurality of different client stations, according to another embodiment.

FIG. 8 is a diagram of another example aggregated PHY data unit 250 that aggregates and includes independent data for a plurality of different client stations (e.g., STA1, STA2, STA3), according to another embodiment. The aggregated PHY data unit 250 includes a preamble 254, a midamble 256, and a midamble 258. As will be described below, the preamble 254 includes information that indicates the start of the midamble 256 and the start of the midamble 258, and this information is transmitted in an omnidirectional manner. In other words, the information that indicates the start of the midamble 256 and the start of the midamble 258 is not steered to particular stations and thus is more likely to be received by all of STA1, STA2, and STA3, at least in some scenarios.

The preamble 254 includes one or more VHT-SIG fields 262 corresponding to station 1 (VHT-SIGs (STA1) 262), one or more VHT-SIG fields 264 corresponding to station 2 (VHT-SIGs (STA2) 264), and one or more VHT-SIG fields 266 corresponding to station 3 (VHT-SIGs (STA3) 266). The VHT-SIGs (STA1) 262 include information that indicates a length duration of the individual PHY data unit corresponding to the preamble 254, and the VHT-SIGs (STA2) 262 include information that indicates a length duration of the individual PHY data unit corresponding to the midamble 256. Similarly, the VHT-SIGs (STA3) 266 include information that indicates a length duration of the individual PHY data unit corresponding to the midamble 258. The preamble 254 also include one or more VHT-TFs 268 corresponding to STA1 (VHT-TFs (STA1) 268).

The VHT-SIGs (STA1) 262, VHT-SIGs (STA2) 264, and VHT-SIGs (STA3) 266 are transmitted in an omnidirectional manner, thus improving odds that all of STA1, STA2, and STA3, will be able to determine length/duration information for all of the PHY data units in the aggregated PHY data unit as compared to the embodiments of FIGS. 3-6, at least in some scenarios. In one embodiment, the VHT-SIGs (STA1) 262, VHT-SIGs (STA2) 264, and VHT-SIGs (STA3) 266 are integrated and/or compressed as compared to similar VHT-SIG fields in the embodiments of FIGS. 3-6.

The midamble 256 omits VHT-SIG corresponding to STA2, and the midamble 258 omits VHT-SIG corresponding to STA3. In one embodiment, each of the midamble 256 and the midamble 258 only includes one or more training fields such as a VHT-STF and/or one or more VHT-LTFs.

Figure 9:
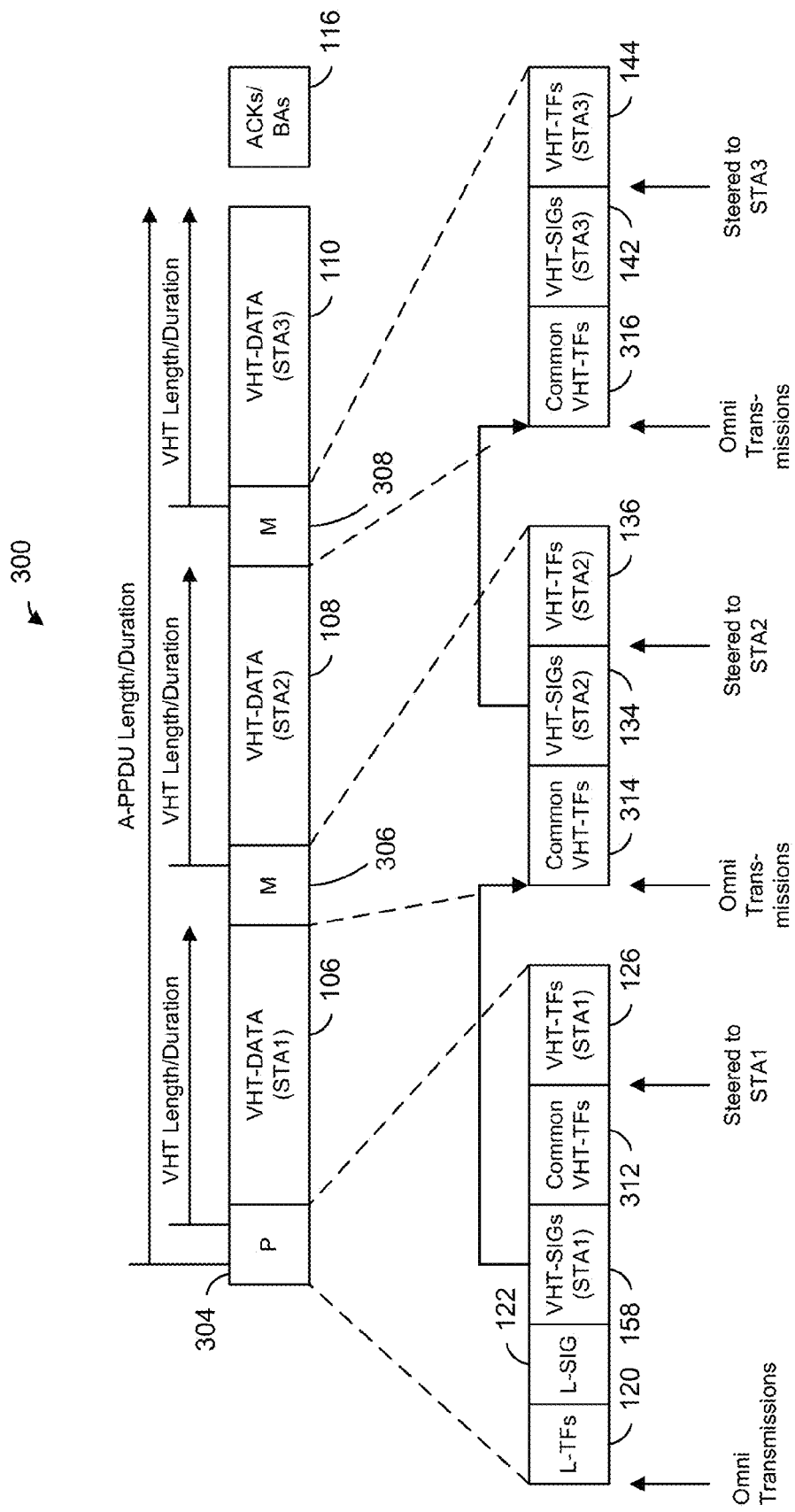
FIG. 9 is a diagram of another example aggregated PHY data unit that aggregates and includes independent data for a plurality of different client stations, according to another embodiment.

FIG. 9 is a diagram of another example aggregated PHY data unit 300 that aggregates and includes independent data for a plurality of different client stations (e.g., STA1, STA2, STA3), according to another embodiment. The aggregated PHY data unit 300 is generally similar to the aggregated PHY data unit 150 of FIG. 4. The aggregated PHY data unit 300 includes a preamble 304, a midamble 306, and a midamble 308. As will be described below, the VHT-SIG fields that include information that indicates the duration of the individual PHY data units within the aggregated PHY data unit 300 are each transmitted in an omnidirectional manner. In other words, the information that indicates the start of the midamble 306 and the start of the midamble 308 is not steered to particular stations and thus is more likely to be received by all of STA1, STA2, and STA3, at least in some scenarios.

The preamble 304 includes the VHT-SIGs (STA1) 158, which are transmitted in an omnidirectional manner. The preamble 304 also includes one or more common VHT-TFs 312 that are also transmitted in an omnidirectional manner, thus providing training fields for all of stations STA1, STA2, and STA3. On the other hand, the VHT-TFs (STA1) 126 and the payload 106 are steered to station 1.

A portion of the midamble 306 is transmitted in an omnidirectional manner. For example, the midamble 306 includes one or more common VHT-TFs 314 and the VHT-SIGs (STA2) 134, which are transmitted in an omnidirectional manner. On the other hand, the VHT-TFs (STA2) 136 and the payload 108 are steered to station 2.

Similarly, a portion of the midamble 308 is transmitted in an omnidirectional manner. For example, the midamble 308 includes one or more common VHT-TFs 316 and the VHT-SIGs (STA3) 142, which are transmitted in an omnidirectional manner. On the other hand, the VHT-TFs (STA3) 144 and the payload 110 are steered to station 3.

In one embodiment, some or all of the common VHT-TFs 314 in the midamble 306 and some or all of the common VHT-TFs 316 in the midamble 308 are omitted when corresponding common VHT-TFs are included in the preamble 304 (i.e., in the common VHT-TFs 312). In one embodiment, some or all of the VHT-TFs (STA2) 136 in the midamble 306 and some or all of the VHT-TFs (STA3) 144 in the midamble 308 are omitted when corresponding common VHT-TFs are included in the preamble 304 (i.e., in the common VHT-TFs 312). In one embodiment, some or all of the VHT-TFs (STA1) 126 in the preamble 304 are omitted when corresponding common VHT-TFs are included in the common VHT-TFs 312. In one embodiment, indications of positions of the VHT-SIG fields in the midambles are included in the VHT-SIGs (STA1) 158.

Figure 10:
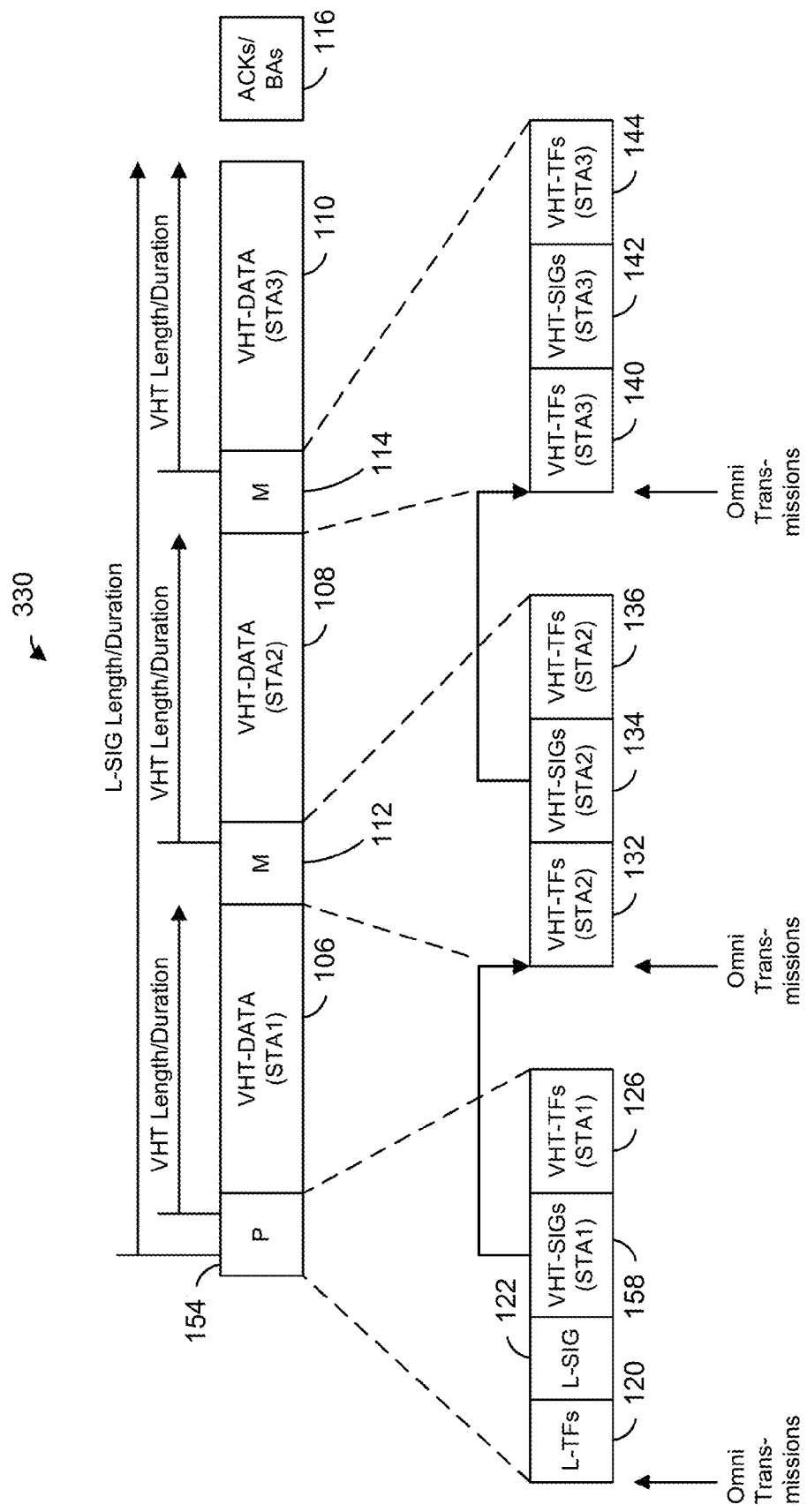
FIG. 10 is a diagram of another example aggregated PHY data unit that aggregates and includes independent data for a plurality of different client stations, according to another embodiment.

In some embodiments, beamsteering is not permitted when transmitting an aggregated PHY data unit. FIG. 10 is a diagram of another example aggregated PHY data unit 330 that aggregates and includes independent data for a plurality of different client stations (e.g., STA1, STA2, STA3), according to another embodiment. The aggregated PHY data unit 330 is generally similar to the aggregated PHY data unit 150 of FIG. 4. With the aggregated PHY data unit 330, however, the entire aggregated PHY data unit 330 is transmitted in an omnidirectional manner.

Figure 11:
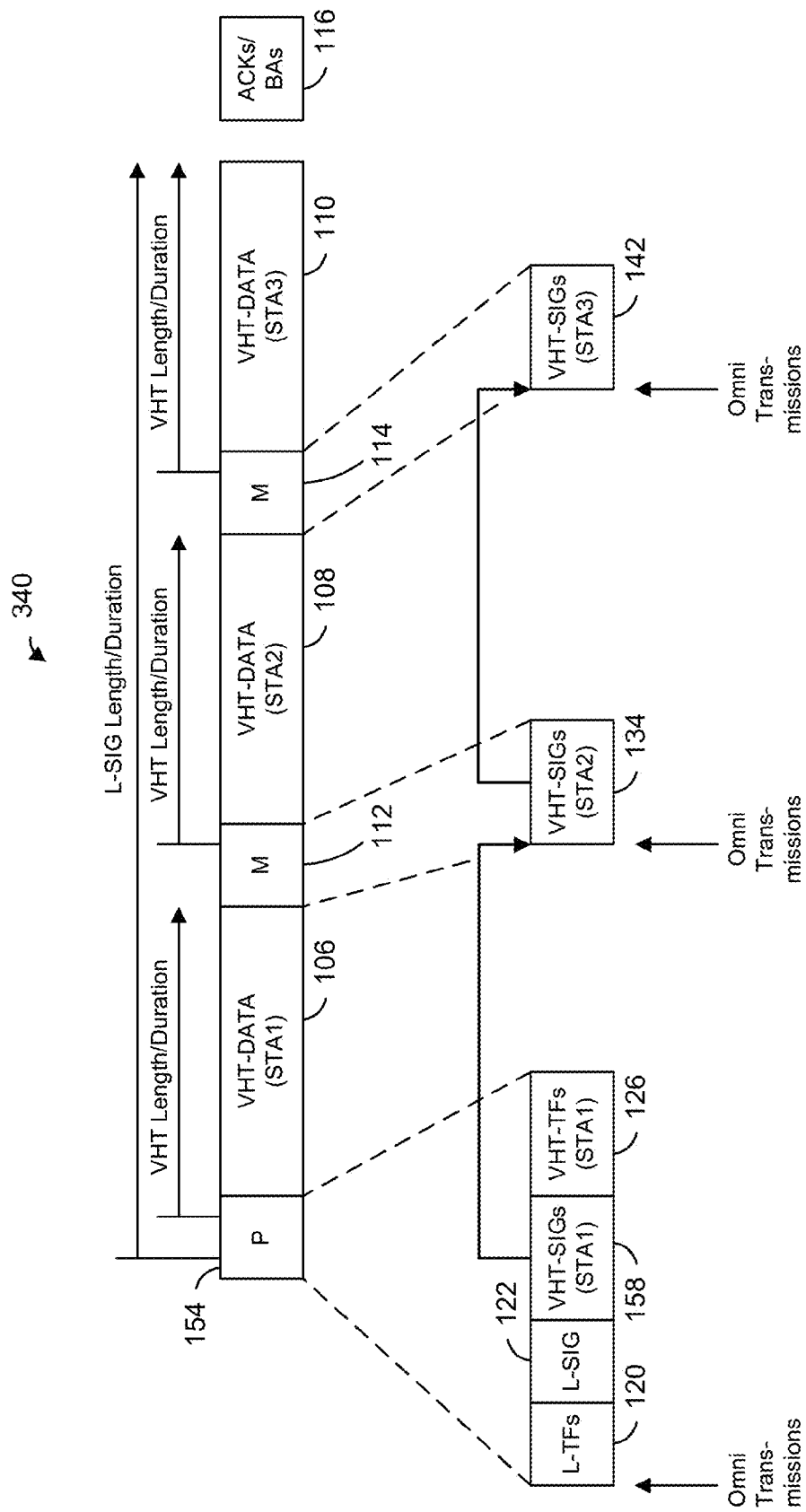
FIG. 11 is a diagram of another example aggregated PHY data unit that aggregates and includes independent data for a plurality of different client stations, according to another embodiment.

FIG. 11 is a diagram of another example aggregated PHY data unit 340 that aggregates and includes independent data for a plurality of different client stations (e.g., STA1, STA2, STA3), according to another embodiment. The aggregated PHY data unit 340 is generally similar to the aggregated PHY data unit 150 of FIG. 4. With the aggregated PHY data unit 330, however, the entire aggregated PHY data unit 340 is transmitted in an omnidirectional manner. The aggregated PHY data unit 340 is generally similar to the aggregated PHY data unit 330 of FIG. 9, but omits the VHT-TFs from the midambles.

Figure 12:
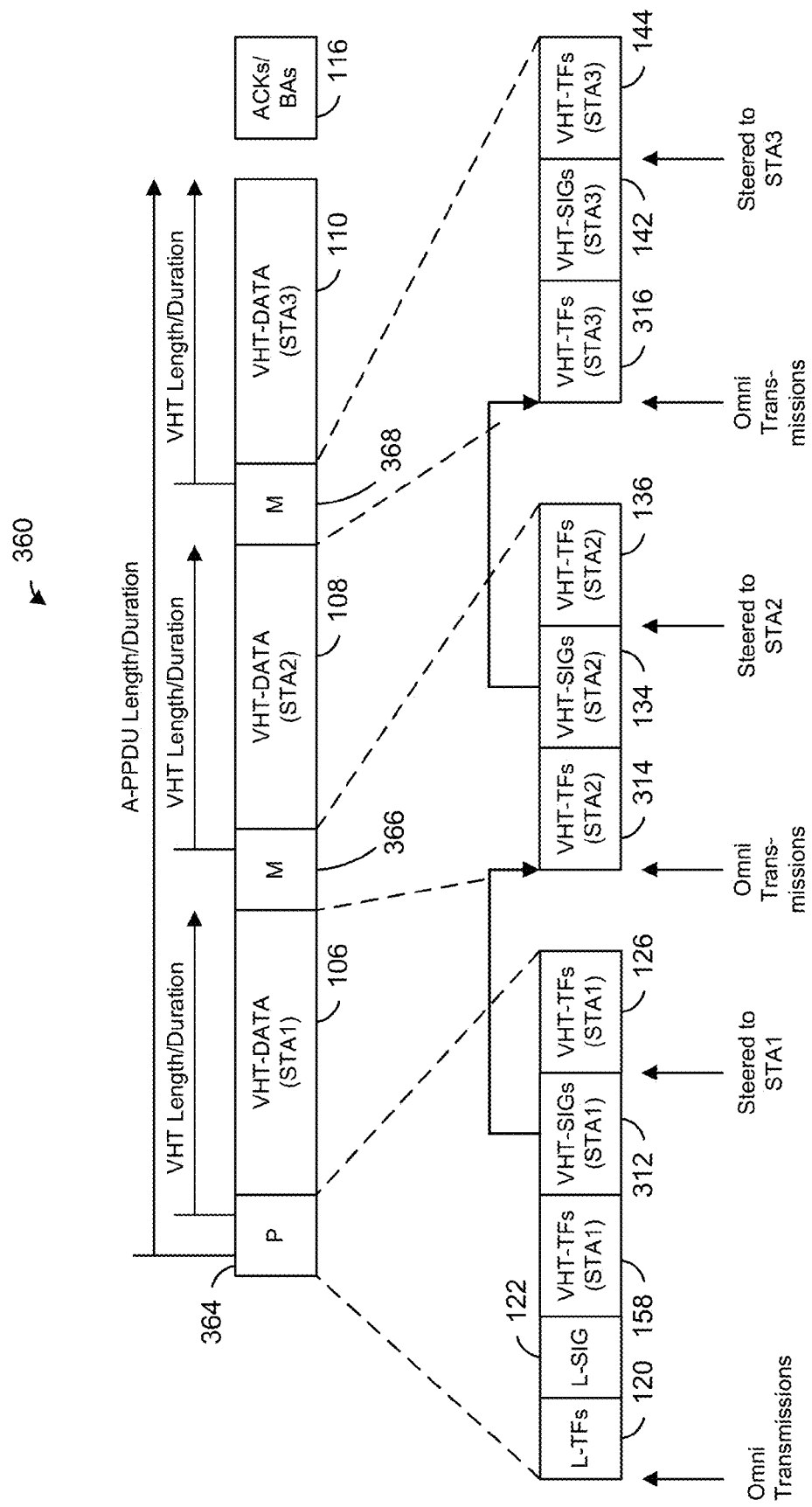
FIG. 12 is a diagram of another example aggregated PHY data unit that aggregates and includes independent data for a plurality of different client stations, according to another embodiment.

FIG. 12 is a diagram of another example aggregated PHY data unit 360 that aggregates and includes independent data for a plurality of different client stations (e.g., STA1, STA2, STA3), according to another embodiment. The aggregated PHY data unit 360 is generally similar to the aggregated PHY data unit 10 of FIG. 4. The aggregated PHY data unit 360 includes a preamble 364, a midamble 366, and a midamble 368. The VHT-SIG fields that include information that indicates the duration of the PHY data units within the aggregated PHY data unit 360 are each transmitted in an omnidirectional manner. In other words, the information that indicates the start of the midamble 364 and the start of the midamble 368 is not steered to particular stations and thus is more likely to be received by all of STA1, STA2, and STA3, at least in some scenarios.

The preamble 364 includes the VHT-SIGs (STA1) 158, which are transmitted in an omnidirectional manner. On the other hand, the VHT-TFs (STA1) 126 and the payload 106 are steered to station 1.

A portion of the midamble 366 is transmitted in an omnidirectional manner. For example, the midamble 366 includes the VHT-TFs (STA2) 314 and the VHT-SIGs (STA2) 134, which are transmitted in an omnidirectional manner. On the other hand, the VHT-TFs (STA2) 136 and the payload 108 are steered to station 2. In one embodiment, the VHT-TFs (STA2) 314 include a VHT-STF and only a first VHT-LTF (VHT-LTF1). On the other hand, the VHT-TFs (STA2) 136, which are steered to STA2, include the VHT-LTFn, wherein n>1.

Similarly, a portion of the midamble 368 is transmitted in an omnidirectional manner. For example, the midamble 368 includes one or more VHT-TFs (STA3) 316 and the VHT-SIGs (STA3) 142, which are transmitted in an omnidirectional manner. On the other hand, the VHT-TFs (STA3) 144 and the payload 110 are steered to station 3. In one embodiment, the VHT-TFs (STA3) 316 include a VHT-STF and only a first VHT-LTF (VHT-LTF1). On the other hand, the VHT-TFs (STA3) 144, which are steered to STA3, include the VHT-LTFn, wherein n>1.

Figure 13:
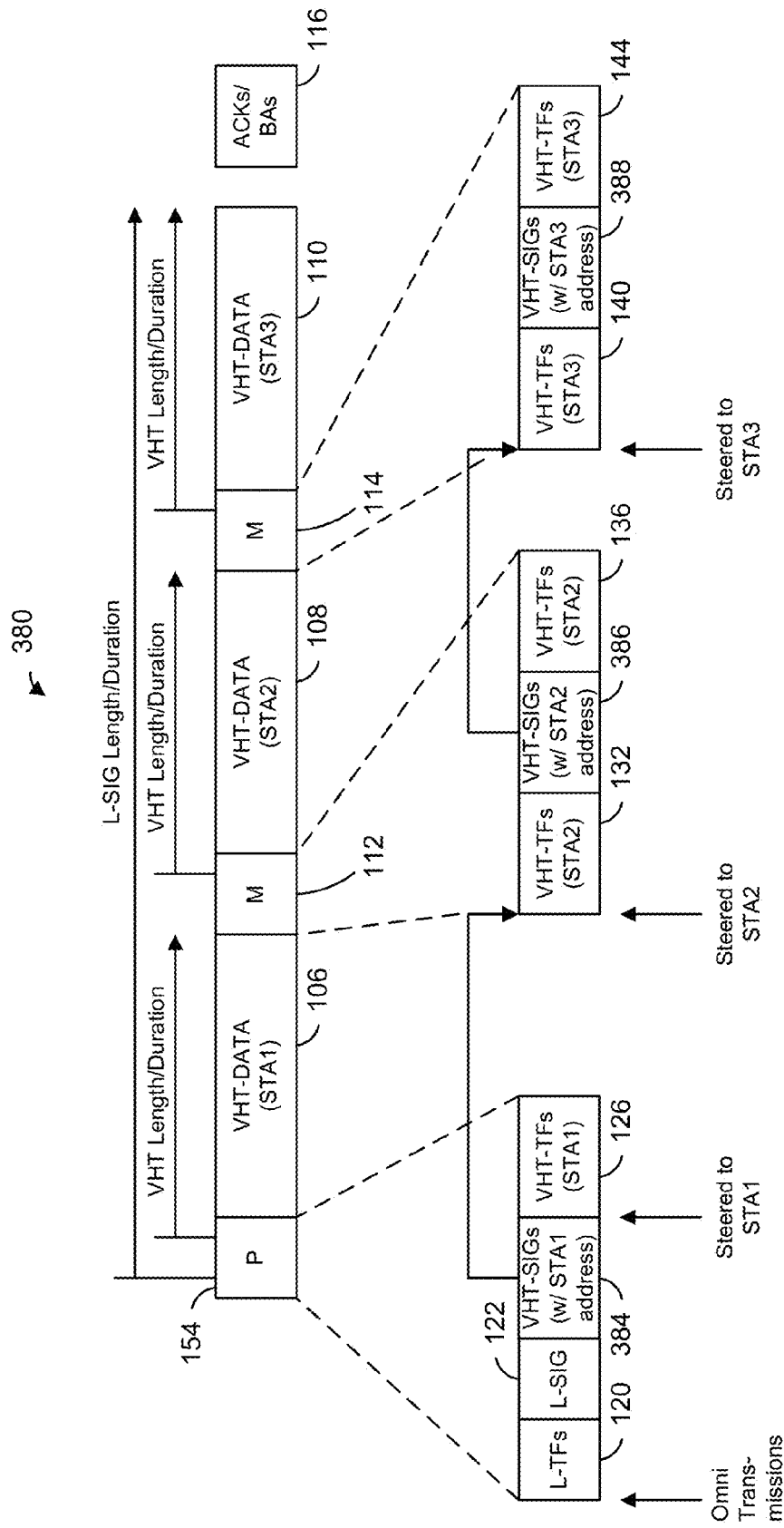
FIG. 13 is a diagram of another example aggregated PHY data unit that aggregates and includes independent data for a plurality of different client stations, according to another embodiment.

FIG. 13 is a diagram of another example aggregated PHY data unit 380 that aggregates and includes independent data for a plurality of different client stations (e.g., STA1, STA2, STA3), according to another embodiment. The aggregated PHY data unit 380 is generally similar to the aggregated PHY data unit 150 of FIG. 4. In the aggregated PHY data unit 380, however, each of the VHT-SIG fields 384, 386, 388 includes an indication of the station to which the respective individual PHY data unit corresponds. In one embodiment, each of the VHT-SIG fields 384, 386, 388 includes an address of the station to which the respective individual PHY data unit corresponds. In these embodiments, a station, after analyzing the address information in the VHT-SIG field may stop receiving the corresponding individual PHY data unit if the address does not correspond to the station, and may then wait for the next midamble.

FIG. 14A is a diagram of another example aggregated PHY data unit 400 that aggregates and includes independent data for a plurality of different client stations (e.g., STA1, STA2), according to another embodiment. The aggregated PHY data unit 400 omits midambles.

A preamble of the aggregated PHY data unit 400 includes one or more L-TFs, and the L-SIG 122. The preamble also includes VHT-SIGs (STA1) 404 and VHT-SIGs (STA2) 408. The preamble also includes VHT-TFs (STA1) 408 and VHT-TFs (STA2) 410.

The aggregated PHY data unit 400 further includes a payload 414 corresponding to STA1 and a payload 416 corresponding to STA2. In response to the aggregated PHY data unit 400, STA1 and STA2 transmit acknowledgements 420 and 422, respectively. If the aggregated PHY data unit 400 is part of a BA session, the acknowledgments transmitted by STA1 and STA2 are transmitted in response to a plurality of aggregated PHY data units including the aggregated PHY data unit 400.

The L-TFs 120, the L-SIG 122, the VHT-SIGs (STA1) 404 and the VHT-SIGs (STA2) 408 are transmitted in an omnidirectional manner. The VHT-SIGs (STA1) 404 include an indication of whether other VHT-SIGs follow the VHT-SIGs (STA1) 404. The VHT-SIGA (STA1) 404 includes length and/or duration information that indicates the length/duration of the payload 414, and thus enables a VHT receiving station (e.g., STA1, STA2) to determine the length/duration of the payload 414. The length and/or duration information in the VHT-SIGA (STA1) 404 also indicates a start of the payload 416.

The VHT-SIGs (STA2) 406 include an indication of whether other VHT-SIGs follow the VHT-SIGs (STA2) 406. The VHT-SIGA (STA2) 406 includes length and/or duration information that indicates the length/duration of the payload 416, and thus enables a VHT receiving station (e.g., STA1, STA2) to determine the length/duration of the payload 416. The length and/or duration information in the VHT-SIGA (STA2) 406 also indicates an end of the aggregated PHY data unit 400.

The VHT-TFs (STA1) 408 are steered to STA1, whereas the VHT-TFs (STA2) 410 are steered to STA2. Similarly, the payload 414 is steered to STA1, whereas the payload 416 is steered to STA2.

FIG. 14B is a diagram of another example aggregated PHY data unit 430 that aggregates and includes independent data for a plurality of different client stations (e.g., STA1, STA2), according to another embodiment. The aggregated PHY data unit 430 is generally similar to the example aggregated PHY data unit 400 of FIG. 14A, but the order of the VHT-TFs (STA1) 408 and the VHT-TFs (STA2) 410 are reversed. This permits one less beamsteering transition as compared to FIG. 14A.

In the embodiments of FIGS. 14A and 14B, the VHT-SIGs 404, 406 are adjacent.

Figure 15A:
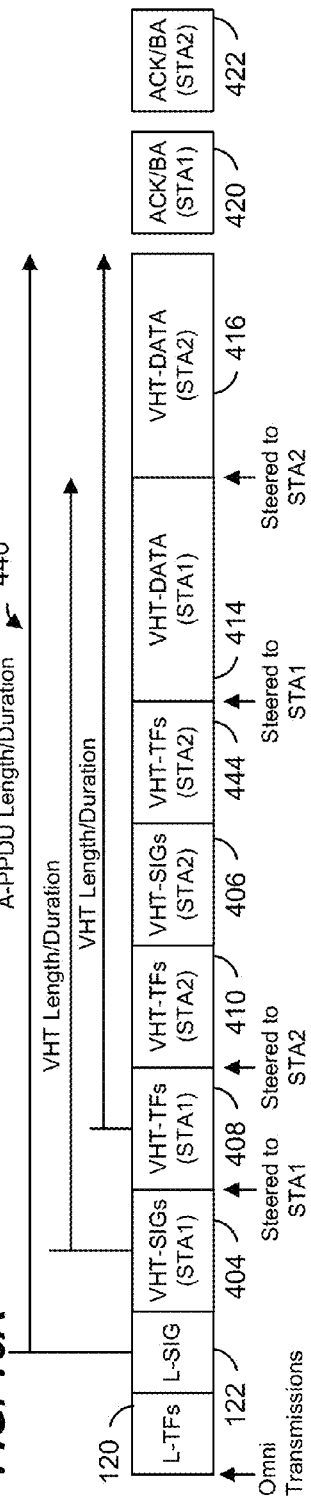
FIG. 15A is a diagram of another example aggregated PHY data unit that aggregates and includes independent data for a plurality of different client stations, according to another embodiment.

FIG. 15A is a diagram of another example aggregated PHY data unit 440 that aggregates and includes independent data for a plurality of different client stations (e.g., STA1, STA2), according to another embodiment. The aggregated PHY data unit 440 is generally similar to the aggregated PHY data unit 400 of FIG. 14A, and omits midambles. Unlike the aggregated PHY data unit 400 of FIG. 14A, however, the VHT-SIGs corresponding to STA1 and STA2 are separated by a plurality of VHT-TFs.

In one embodiment, the preamble of the PHY data unit 440 includes a second set of VHT-TFs (STA2) 444 after the VHT-SIGs (STA2) 406. In another embodiment, the second set of VHT-TFs (STA2) 444 is omitted.

Figure 15B:
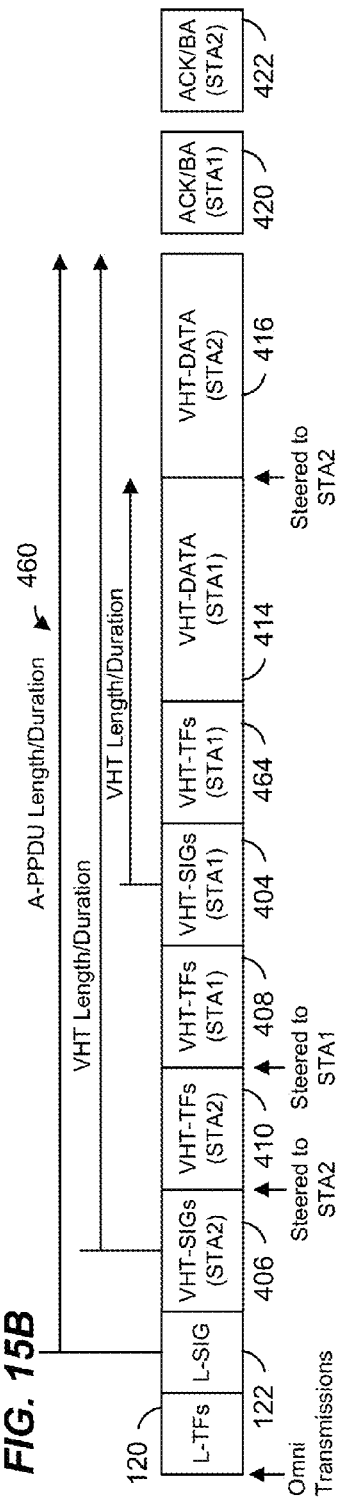
FIG. 15B is a diagram of another example aggregated PHY data unit that aggregates and includes independent data for a plurality of different client stations, according to another embodiment.

FIG. 15B is a diagram of another example aggregated PHY data unit 460 that aggregates and includes independent data for a plurality of different client stations (e.g., STA1, STA2), according to another embodiment. The aggregated PHY data unit 460 is generally similar to the aggregated PHY data unit 440 of FIG. 15A, and omits midambles. As compared to the aggregated PHY data unit 440 of FIG. 15A, the order of the VHT-SIGs 404 and 406 are reversed. Similarly, the order of the VHT-TFs 408 and 410 are reversed. Further, the second set of VHT-TFs (STA2) 444 is omitted.

In one embodiment, the preamble of the PHY data unit 460 includes a second set of VHT-TFs (STA1) 464 after the VHT-SIGs (STA1) 404. In another embodiment, the second set of VHT-TFs (STA1) 464 is omitted.

Figure 15C:
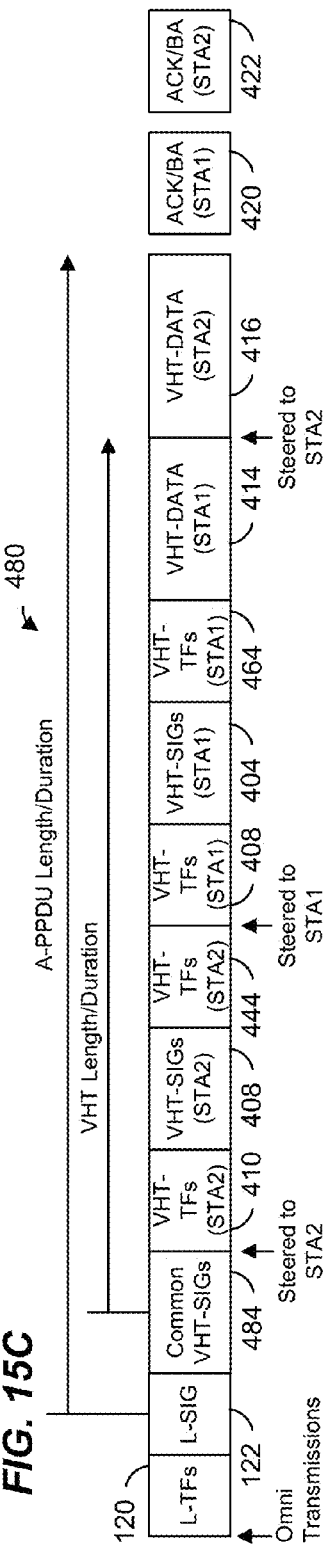
FIG. 15C is a diagram of another example aggregated PHY data unit that aggregates and includes independent data for a plurality of different client stations, according to another embodiment.

FIG. 15C is a diagram of another example aggregated PHY data unit 480 that aggregates and includes independent data for a plurality of different client stations (e.g., STA1, STA2), according to another embodiment. The aggregated PHY data unit 480 is generally similar to the aggregated PHY data unit 460 of FIG. 15B, and omits midambles.

As compared to the aggregated PHY data unit 460 of FIG. 15B, a set of VHT-TFs precedes each of the VHT-SIGs 404 and 406. Additionally, a common VHT-SIGs field 484 precedes the VHT-TFs and the VHT-SIGs 404 and 406, and the common VHT-SIGs field 484 is transmitted in an omnidirectional manner. In one embodiment, the common VHT-SIGs field 484 includes information indicating one or more of the length/duration of the aggregated PHY data unit 480, the number of payloads 414, 416, index and/or sequence information for the payloads 414, 416, length/duration for each of at least some of the payloads 414,416 (e.g., for all payloads, for all payloads except the last payload, etc.).

In one embodiment, the preamble of the PHY data unit 480 includes the second set of VHT-TFs (STA1) 464 after the VHT-SIGs (STA1) 404. In another embodiment, the second set of VHT-TFs (STA1) 464 is omitted. In one embodiment, the preamble of the PHY data unit 480 includes the second set of VHT-TFs (STA2) 444 after the VHT-SIGs (STA2) 406. In another embodiment, the second set of VHT-TFs (STA2) 444 is omitted. In one embodiment, the preamble of the PHY data unit 480 includes the second set of VHT-TFs (STA1) 464 after the VHT-SIGs (STA1) 404, and includes the second set of VHT-TFs (STA2) 444 after the VHT-SIGs (STA2) 406. In one embodiment, the preamble of the PHY data unit 480 omits both the second set of VHT-TFs (STA1) 464 and includes the second set of VHT-TFs (STA2) 444.

Figures 16A, 16B, 16C:
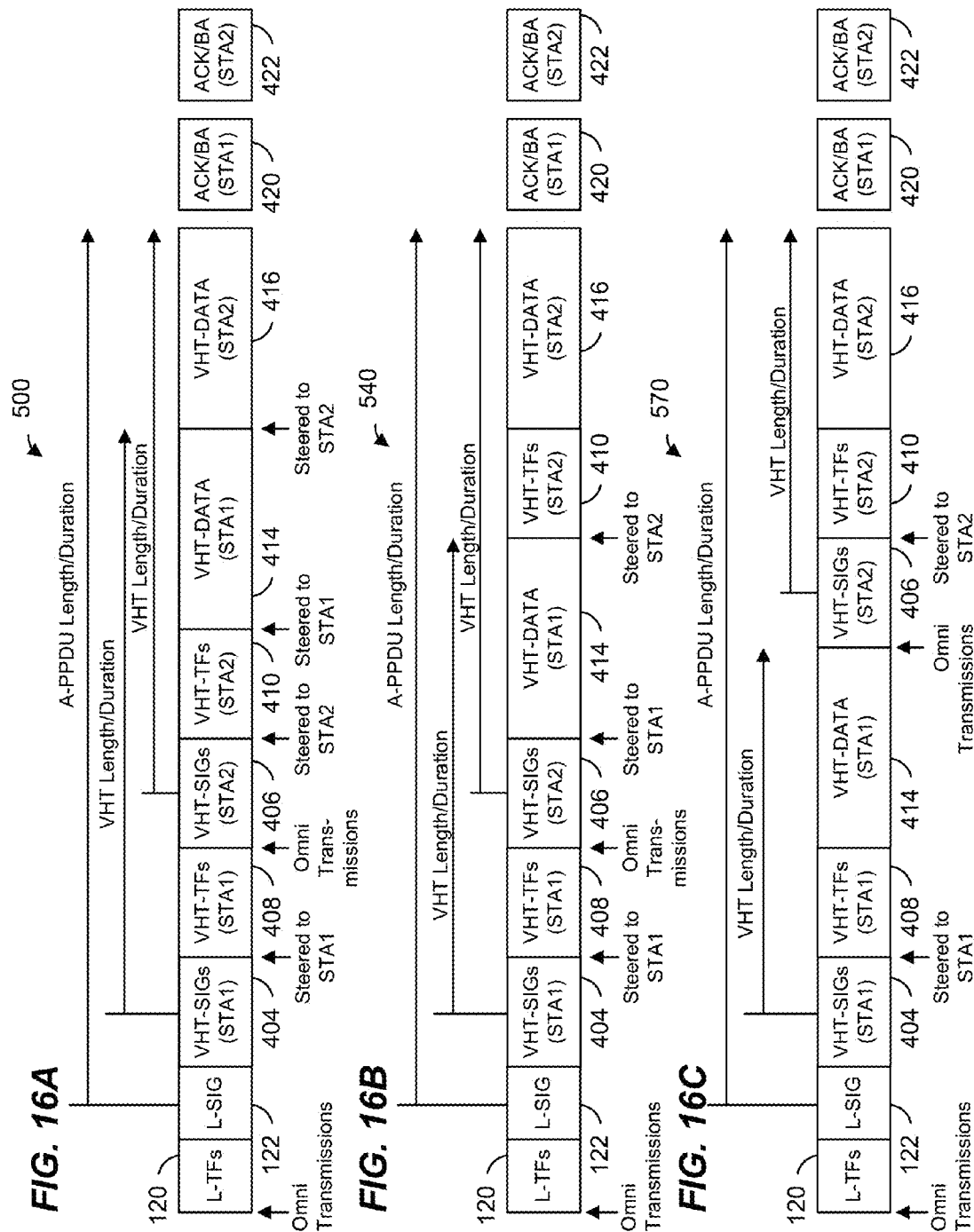
FIG. 16A is a diagram of another example aggregated PHY data unit that aggregates and includes independent data for a plurality of different client stations, according to another embodiment.
FIG. 16B is a diagram of another example aggregated PHY data unit that aggregates and includes independent data for a plurality of different client stations, according to another embodiment.
FIG. 16C is a diagram of another example aggregated PHY data unit that aggregates and includes independent data for a plurality of different client stations, according to another embodiment.

FIG. 16A is a diagram of another example aggregated PHY data unit 500 that aggregates and includes independent data for a plurality of different client stations (e.g., STA1, STA2), according to another embodiment. The aggregated PHY data unit 500 is generally similar to the example aggregated PHY data unit 400 of FIG. 14A, but the VHT-SIGs 404, 406 are not adjacent, VHT-TFs corresponding to a VHT-SIGs field and prior to the VHT-SIGs field are omitted, whereas a corresponding VHT-TFs field occurs after each VHT-SIGs field.

FIG. 16B is a diagram of another example aggregated PHY data unit 540 that aggregates and includes independent data for a plurality of different client stations (e.g., STA1, STA2), according to another embodiment. The aggregated PHY data unit 540 is generally similar to the example aggregated PHY data unit 500 of FIG. 16A, but the order of the VHT-SIGs (STA1) 404 and the VHT-TFs (STA1) 408 is reversed, and the aggregated PHY data unit 540 includes a midamble prior to the payload 416, where the preamble includes the VHT-TFs (STA2) 410.

FIG. 16C is a diagram of another example aggregated PHY data unit 570 that aggregates and includes independent data for a plurality of different client stations (e.g., STA1, STA2), according to another embodiment. The aggregated PHY data unit 570 is generally similar to the example aggregated PHY data unit 540 of FIG. 16B, but the midamble also includes the VHT-SIGs (STA1) 406 prior to the VHT-TFs (STA2) 410.

Figure 17:
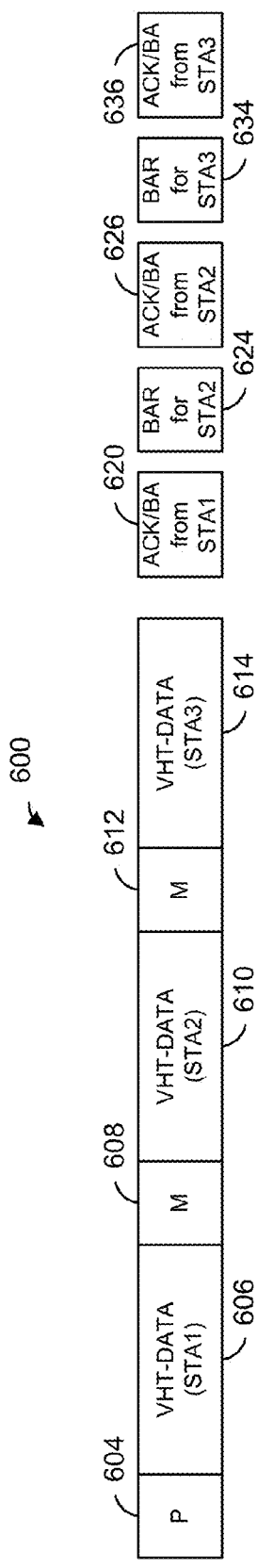
FIG. 17 is a diagram of another example aggregated PHY data unit that aggregates and includes independent data for a plurality of different client stations, according to another embodiment.

Acknowledgments (ACKs) and block acknowledgments (BAs) can be utilized with any of the example aggregated PHY data units discussed above. FIG. 17 is diagram of another example aggregated PHY data unit 600 that aggregates and includes independent data for a plurality of different client stations (e.g., STA1, STA2, STA3), according to another embodiment. The aggregated PHY data unit 600 includes a preamble 604, a payload 606 corresponding to STA1, a midamble 608, a payload 610 corresponding to STA2, a midamble 612, and a payload 614 corresponding to STA3.

In response to the aggregated PHY data unit 600, the station corresponding to the first payload in the aggregated PHY data unit 600 (i.e., STA1) transmits an ACK or BA 620. In other words, at most one station is allowed to send an immediate acknowledgement. On the other hand, the stations corresponding to the remaining payloads in the aggregated PHY data unit 600 (i.e., STA2, STA3) wait for an acknowledgement request, such as a block acknowledgement request (BAR). In other words, at most one station (e.g., the station corresponding to the first payload) is allowed to send an immediate acknowledgement.

The AP transmits an acknowledgement request 624, such as a BAR, corresponding to STA2. In response to the acknowledgement request 624, STA2 transmits an ACK or BA 626. Similarly, the AP transmits an acknowledgement request 634, such as a BAR, corresponding to STA3. In response to the acknowledgement request 634, STA3 transmits an ACK or BA 636.

In the embodiment of FIG. 17, the ACKs and ACK requests are separated from each other in time, such as by at least the SIFS.

Figure 18:
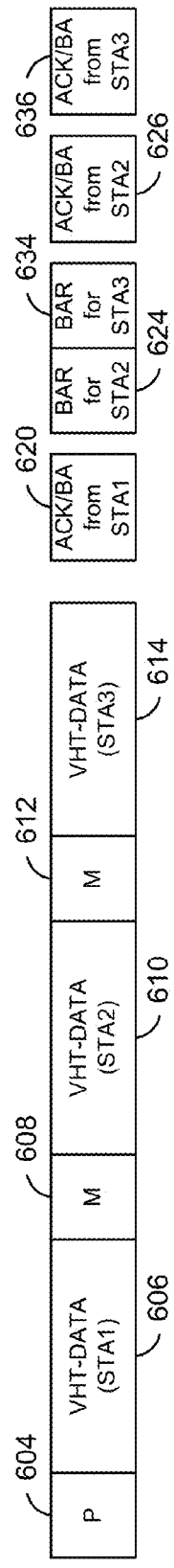
FIG. 18 is a diagram of another example aggregated PHY data unit that aggregates and includes independent data for a plurality of different client stations, according to another embodiment.

FIG. 18 is diagram of another example aggregated PHY data unit 640 that aggregates and includes independent data for a plurality of different client stations (e.g., STA1, STA2, STA3), according to another embodiment. The aggregated PHY data unit 640 is generally similar to the example aggregated PHY data unit 600 of FIG. 17, but the acknowledgement request 624 and the acknowledgement request 634 are aggregated into a single PHY data unit 644, i.e., there is no spacing between the acknowledgement request 624 and the acknowledgement request 634, and/or no ACK/BA is transmitted by a station in between the acknowledgement request 624 and the acknowledgement request 634. Similar to the example aggregated PHY data unit 600 of FIG. 17, at most one station (e.g., the station corresponding to the first payload) is allowed to send an immediate acknowledgement.

Figure 19:
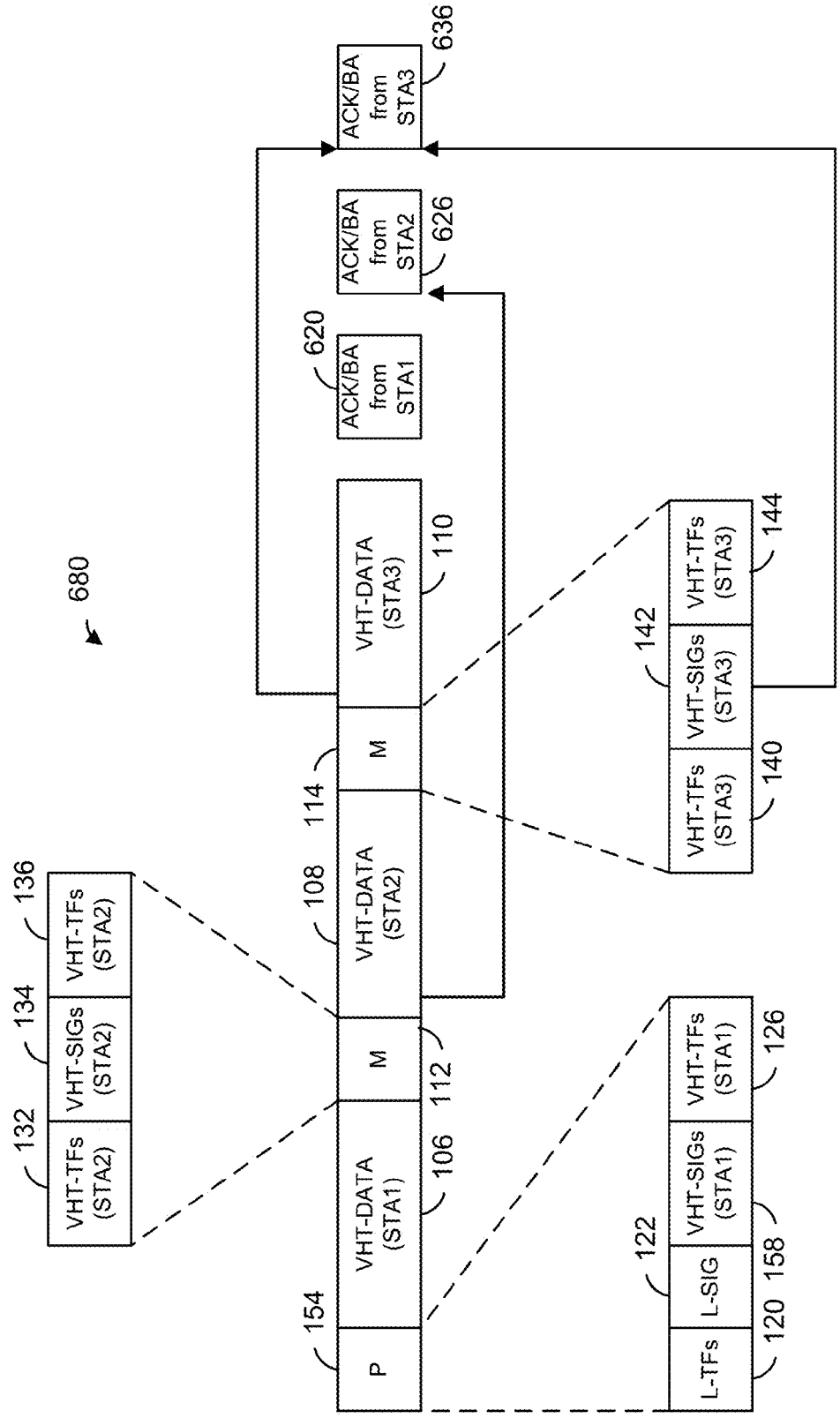
FIG. 19 is a diagram of another example aggregated PHY data unit that aggregates and includes independent data for a plurality of different client stations, according to another embodiment.

FIG. 19 is diagram of another example aggregated PHY data unit 680 that aggregates and includes independent data for a plurality of different client stations (e.g., STA1, STA2, STA3), according to another embodiment. The aggregated PHY data unit 680 is generally similar to the example aggregated PHY data unit 150 of FIG. 4.

Similar to the example aggregated PHY data unit 600 of FIG. 17, at most one station (e.g., the station corresponding to the first payload) is allowed to send an immediate acknowledgement. Other stations send acknowledgments at times corresponding to ACK scheduling information provided in the aggregated PHY data unit 680. In some embodiments, the ACK scheduling information is included in PHY portions of the data unit 680, such as in VHT-SIGs. The ACK scheduling information includes one or more of a starting time, a slot allocation (e.g., a starting time and duration), a sequence or index, etc., in various embodiments.

In some embodiments, the ACK scheduling information is included in MAC portions of the data unit 680, such as in a MAC header duration field or some other suitable MAC header field.

Although FIGS. 17-19 discussed ACK/BA techniques in the context of particular aggregated PHY data unit formats, other formats can be utilized as well, such as aggregated PHY data unit formats that omit midambles.

Figure 20:
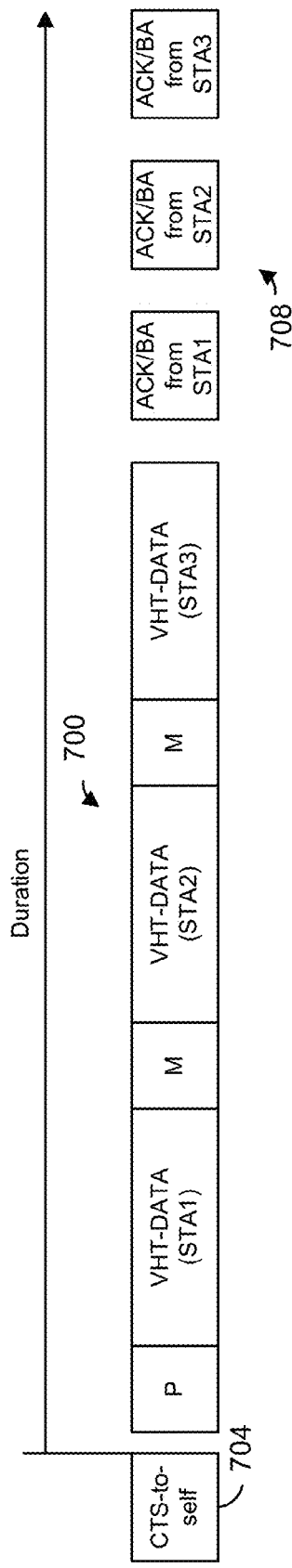
FIG. 20 is a diagram of another example aggregated PHY data unit that aggregates and includes independent data for a plurality of different client stations, according to another embodiment.

FIG. 20 is a diagram of another example aggregated PHY data unit 700 that aggregates and includes independent data for a plurality of different client stations (e.g., STA1, STA2, STA3), according to another embodiment. In one embodiment, the aggregated PHY data unit 700 is transmitted by an AP. Prior to transmitting the aggregated PHY data unit 700, the AP transmits a clear-to-send-to-self (CTS-to-self) 704. The CTS-to-self 704 includes length/duration information that indicates to other stations the length/duration of the aggregated PHY data unit 700 as well as an ACK/BA period 708 following the aggregated PHY data unit 700. In other embodiments, the AP additionally transmits a request-to-send (RTS) to each station for which the aggregated PHY data unit 700 includes a corresponding payload, and receives, in response, a CTS from each station.

In other embodiments, the AP additionally transmits a request-to-send (RTS) to each station for which the aggregated PHY data unit 700 includes a corresponding payload, and receives, in response, a CTS from each station.

Figure 21:
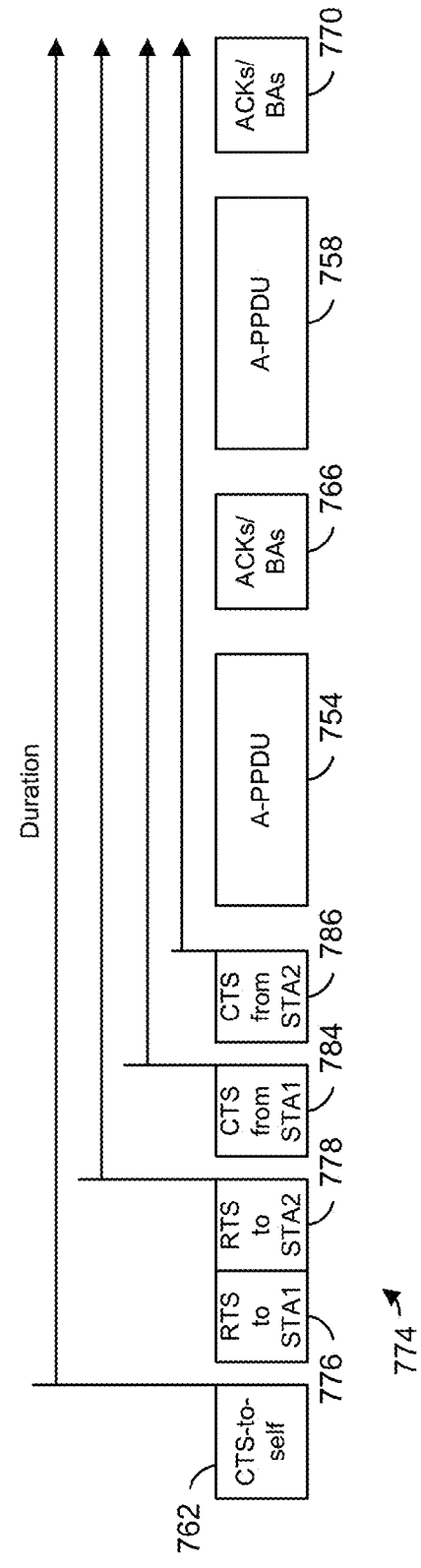
FIG. 21 is a diagram of another example aggregated PHY data unit that aggregates and includes independent data for a plurality of different client stations, according to another embodiment.

FIG. 21 is a diagram of an example series of aggregated PHY data units that include independent data for a plurality of different client stations (e.g., STA1, STA2), according to another embodiment. Prior to transmitting aggregated PHY data units 754, 758, the AP transmits a CTS-to-self 762. The CTS-to-self 762 includes length/duration information that indicates to other stations the length/duration of the aggregated PHY data units 754, 758 as well as associated ACK/BA periods 766, 770, each following the corresponding aggregated PHY data units 754, 758.

After transmitting the CTS-to-self 762, the AP transmits an aggregated RTS 774 that includes an RTS 776 to STA1 and an RTS 778 to STA2. The RTS 774 is integrated, i.e., there is no spacing between the RTS 776 and the RTS 778, and/or no CTS is transmitted by a station in between the RTS 776 and the RTS 778. In response to the aggregated RTS 774, STA1 transmits a CTS 784 and STA2 transmit a CTS 786. Each of the aggregated RTS 774, the CTS 784, and the CTS 786 includes length/duration information that indicates to other stations the length/duration of the aggregated PHY data units 754, 758 as well as associated ACK/BA periods 766, 770.

In one embodiment, STA1 transmits the CTS 784 immediately in response to the aggregated RTS 774. In one embodiment, the aggregated RTS 774 includes scheduling information for the CTS 786 so that STA2 determines when to transmit the CTS 786. In one embodiment, the CTS-to-self 762 is omitted.

Figure 22:
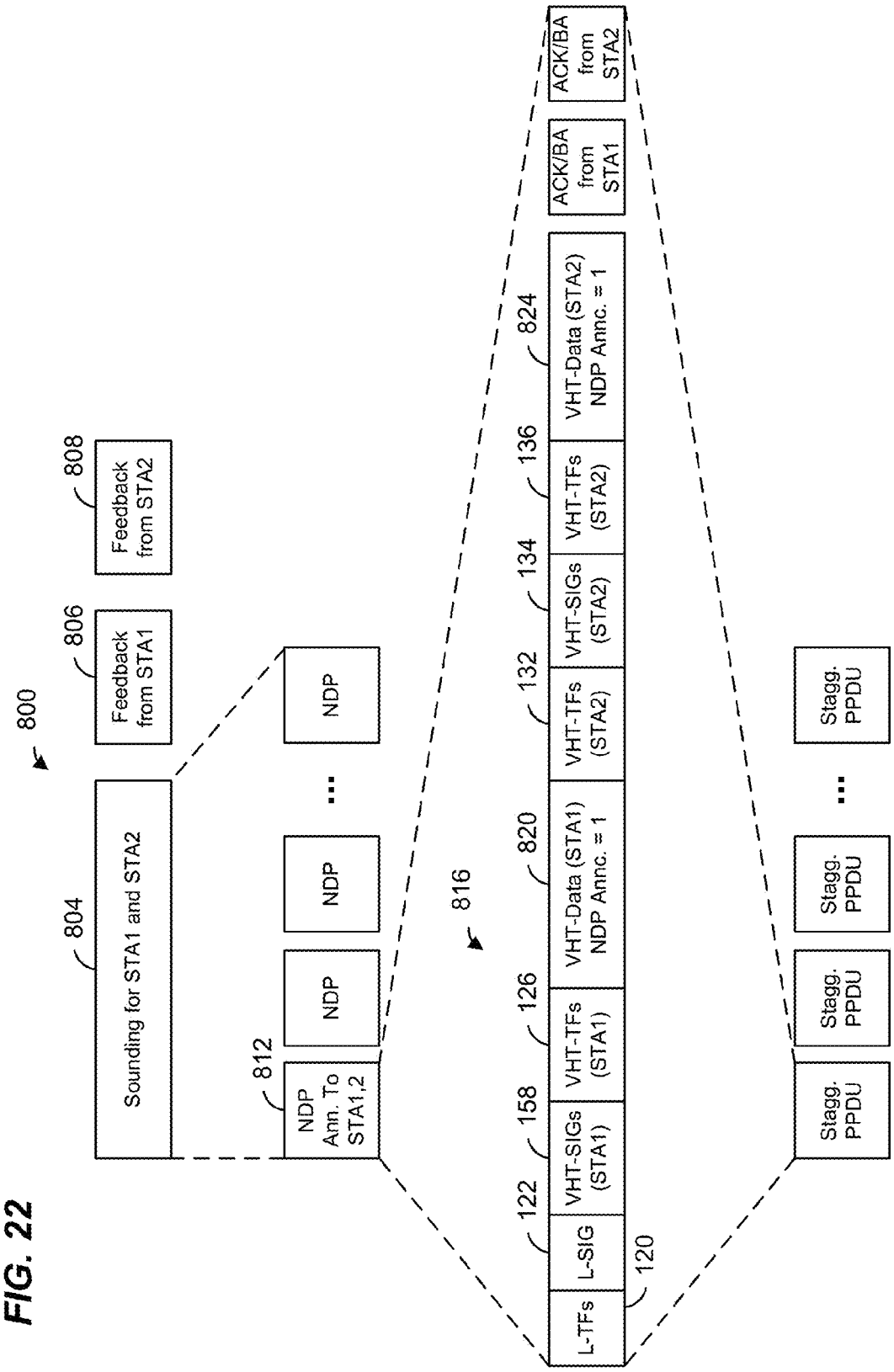
FIG. 22 is a diagram of an example channel sounding exchange, according to an embodiment.

In some embodiments, aggregated PHY data units that include independent data for a plurality of different client stations are utilized in channel sounding procedures. FIG. 22 is a diagram of an example channel sounding exchange 800, according to an embodiment. An AP transmits sounding information 804 to STA1 and STA2. STA1 and STA2 response with sounding feedback 806, 808, respectively.

The sounding information 804 includes a null data packet (NDP) announcement 812 to STA1 and STA2, in one embodiment. The NDP announcement 812 to STA1 and STA2 includes an aggregated PHY data unit 816, in one embodiment. The aggregated PHY data unit 816 has a format generally the same as the aggregated PHY data unit 150 of FIG. 4, in one embodiment. In other embodiments, the aggregated PHY data unit 816 has another suitable format. A payload 820 for STA1 includes an NDP announcement for STA1, and a payload 822 for STA2 includes an NDP announcement for STA2. In one embodiment, the aggregated PHY data unit 816 is considered a staggered PHY data unit. With staggered sounding, spatial spreading is performed separately for training symbols associated with the data dimensions and the training symbols associated with the extra spatial dimensions (extension spatial streams in IEEE 802.11n). In this way, the sounding for the extension spatial streams may be separated in time from the sounding for the data dimensions. Staggered sounding may be used when the number of dimensions to be sounded is greater than the number of data dimensions, or space time streams.

Figure 23A:
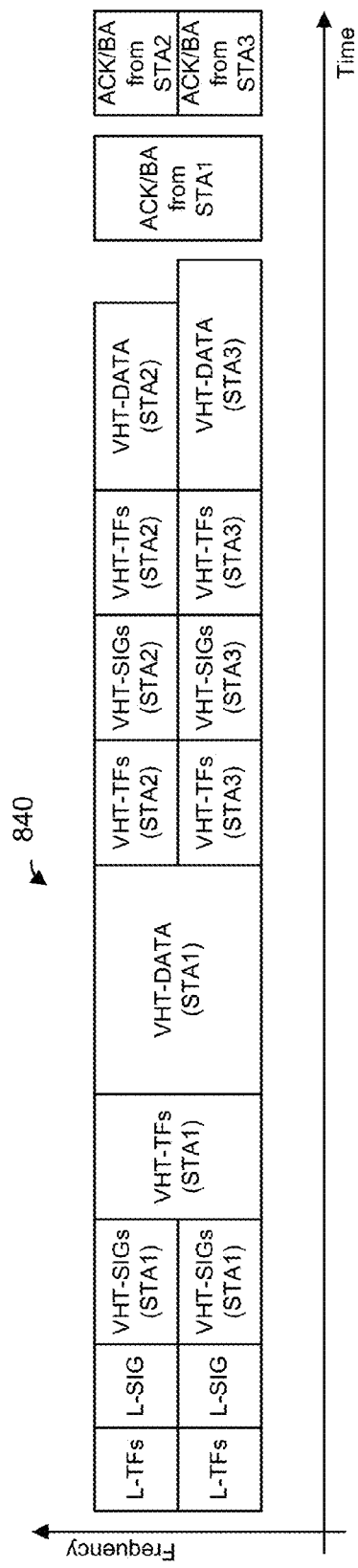
FIGS. 23A and 23B are diagrams of other example aggregated PHY data units that aggregate and include independent data for a plurality of different client stations, according to other embodiments.
Figure 23B:
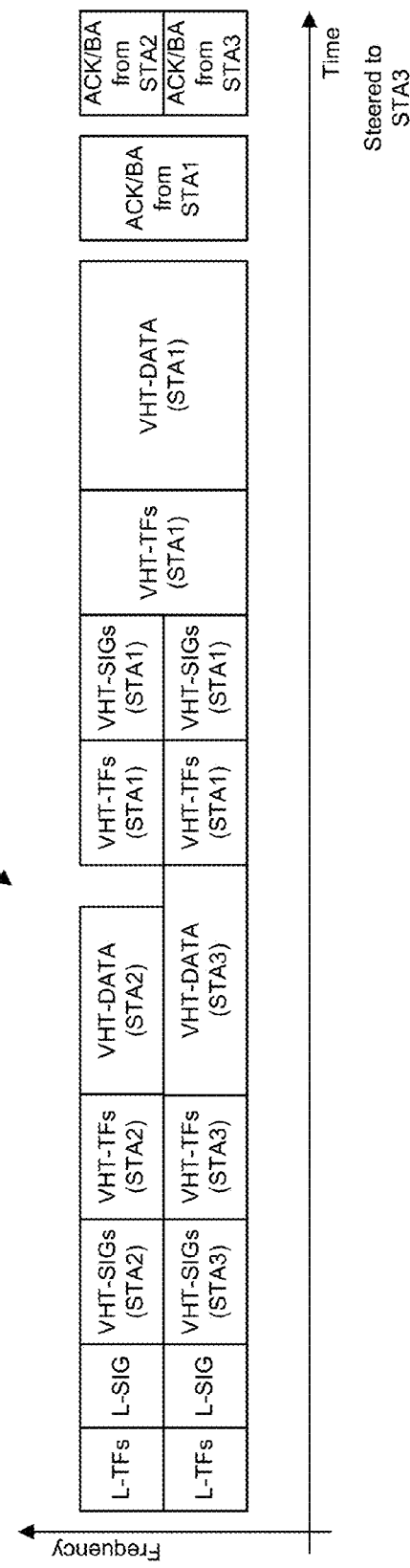

Aggregated PHY data unit techniques, such as the techniques described above, may be used in conjunction with frequency division multiplexing (FDM) techniques such as described in U.S. patent application Ser. No. 12/730,651, entitled "OFDMA with Block Tone Assignment for WLAN," filed on Mar. 24, 2010, which is hereby incorporated by reference herein in its entirety. FIGS. 23A and 23B are examples of aggregated PHY data units 840, 870 that employ FDM, according to some embodiments. As merely one example, each aggregated PHY data unit 840, 870 has a bandwidth of 40 MHz that is multiplexed into two 20 MHz portions for a subset of the aggregated PHY data unit 840, 870. In this example, each subset of each aggregated PHY data unit 840, 870 generally is similar to the format of the aggregated PHY data unit 150 of FIG. 4, according to some embodiments. In other embodiments, each aggregated PHY data unit 840, 870 has another suitable bandwidth such as 80 MHz, 120 MHz, 160 MHz, etc.

Figure 24:
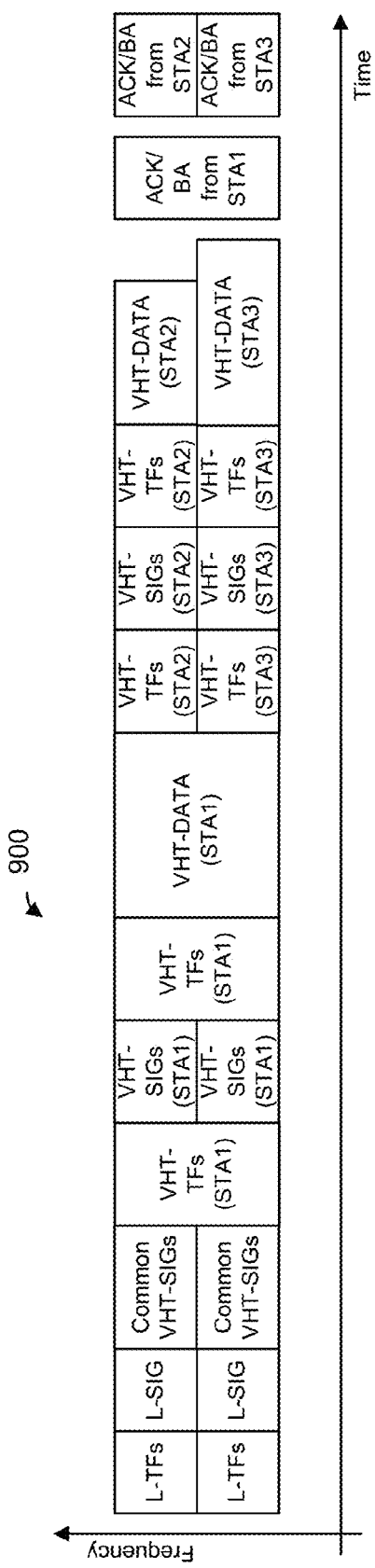
FIG. 24 is a diagram of another example aggregated PHY data unit that aggregates and includes independent data for a plurality of different client stations, according to another embodiment.
Figure 25:
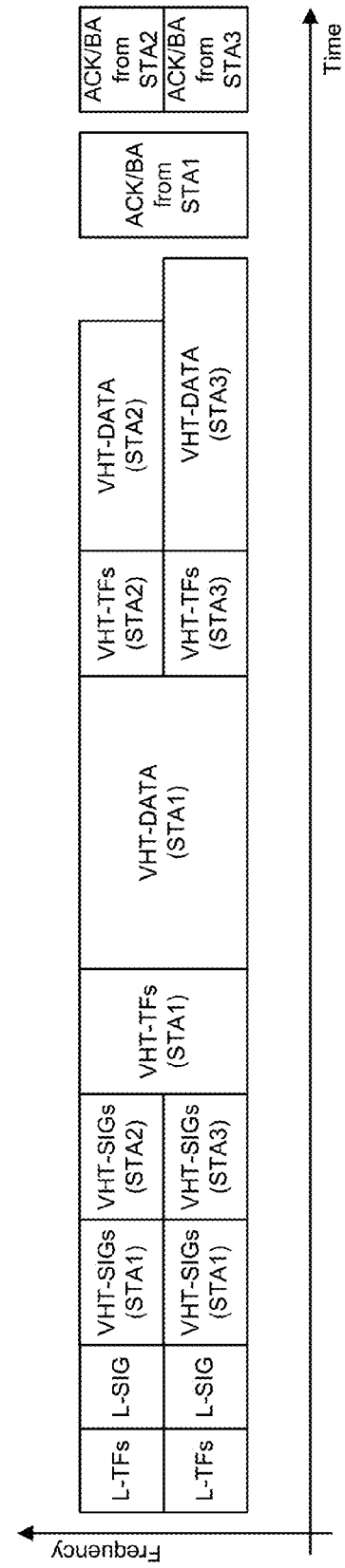
FIG. 25 is a diagram of another example aggregated PHY data unit that aggregates and includes independent data for a plurality of different client stations, according to another embodiment.

FIGS. 24 and 25 are additional examples of aggregated PHY data units 900, 930 that employ FDM, according to some embodiments. As merely one example, each aggregated PHY data unit 900, 930 has a bandwidth of 40 MHz that is multiplexed into two 20 MHz portions for a subset of the aggregated PHY data unit 900, 930. In this example, each subset of each aggregated PHY data unit 900 is generally similar to the format of the aggregated PHY data unit 200 of FIG. 6, according to some embodiments. Also in this example, each subset of each aggregated PHY data unit 930 is generally similar to the format of the aggregated PHY data unit 250 of FIG. 8, according to some embodiments. In other embodiments, each aggregated PHY data unit 900, 930 has another suitable bandwidth such as 80 MHz, 120 MHz, 160 MHz, etc.

Figure 27:
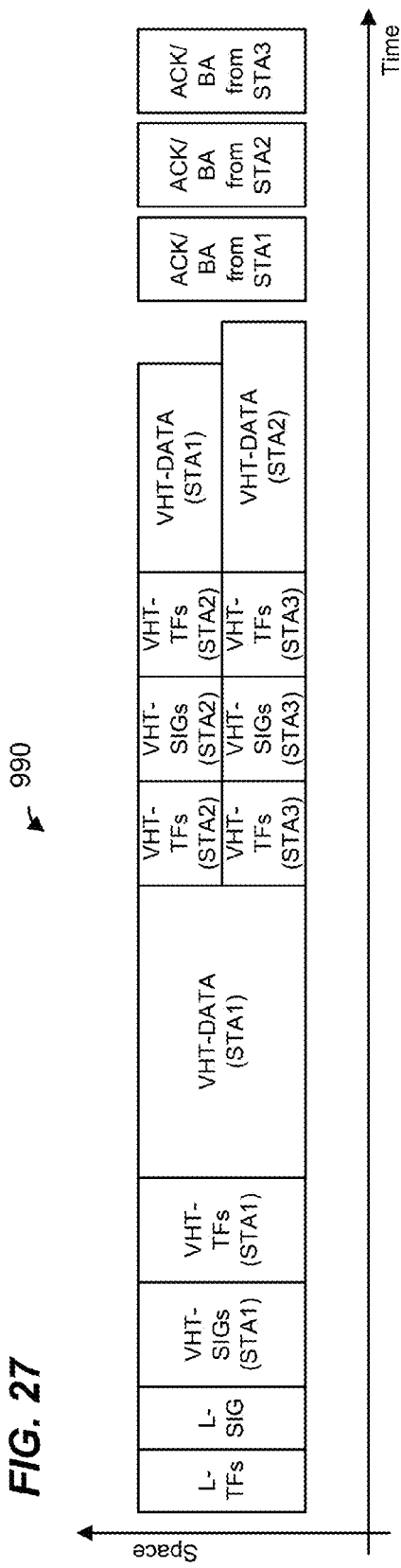
FIG. 27 is a diagram of another example aggregated PHY data unit that aggregates and includes independent data for a plurality of different client stations, according to another embodiment.

Aggregated PHY data unit techniques, such as the techniques described above, may be used in conjunction with spatial division multiplexing (SDM) techniques. FIGS. 26A and 26B are examples of aggregated PHY data units 960, 980 that employ SDM, according to some embodiments. In these examples, each aggregated PHY data unit 960, 980 generally is similar to the format of the aggregated PHY data unit 200 of FIG. 6, according to some embodiments. FIG. 27 is another example of an aggregated PHY data unit 990 that employs SDM, according to an embodiment. In this example, the aggregated PHY data unit 990 generally is similar to the format of the aggregated PHY data unit 150 of FIG. 4, according to an embodiment. FIG. 27 is another example of an aggregated PHY data unit 990 that employs SDM, according to an embodiment. In this example, the aggregated PHY data unit 990 generally is similar to the format of the aggregated PHY data unit 150 of FIG. 4, according to an embodiment.

Figure 28:
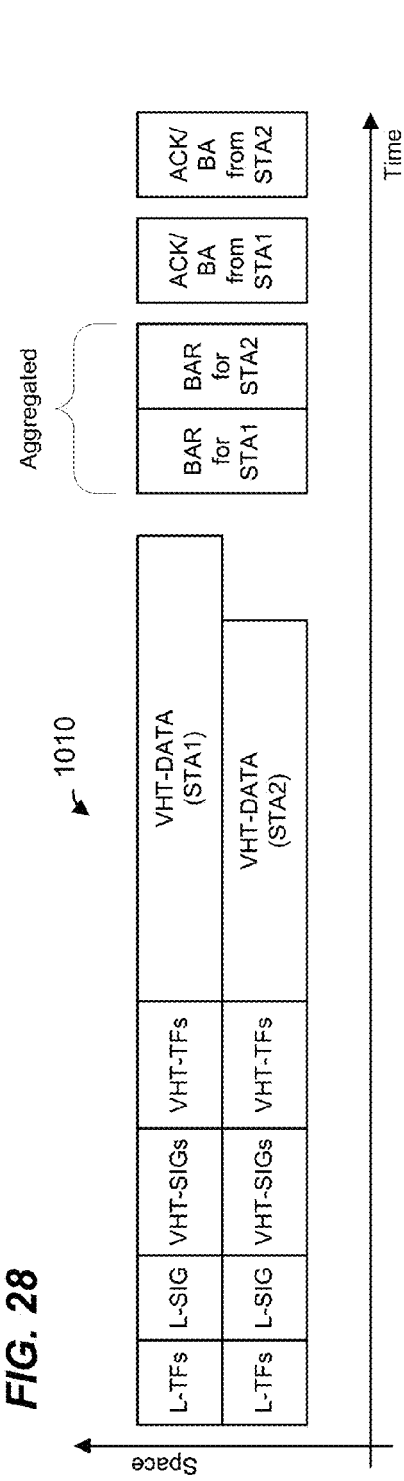
FIG. 28 is a diagram of an aggregated PHY data unit that utilizes spatial division multiplexing (SDM) and aggregated block acknowledgment request (BAR) techniques, according to another embodiment.
Figure 29:
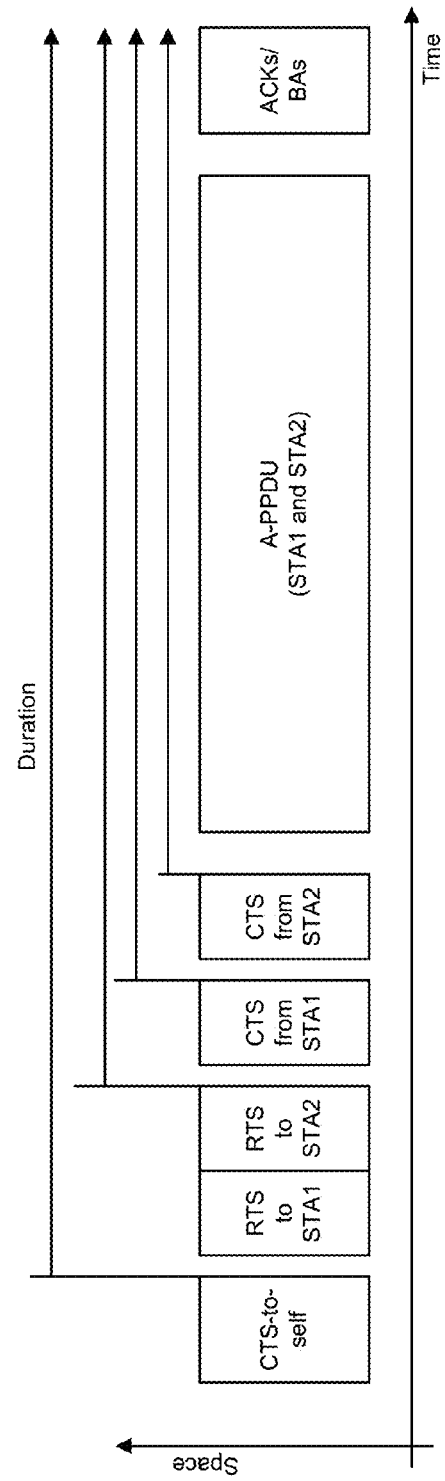
FIG. 29 is a diagram of an example series of aggregated PHY data units that include independent data for a plurality of different client stations and that utilizes SDM, according to another embodiment.

Acknowledgment techniques discussed above can also be utilized in the context of FDM and/or SDM techniques. FIG. 28 is a diagram of an aggregated PHY data unit 101 that utilizes SDM and aggregated BAR techniques, according to another embodiment. In this example, the aggregated BAR and response to the aggregated BAR by STA1 and STA2 are generally similar to the example aggregated BAR of FIG. 18, according to an embodiment. FIG. 29 is a diagram of an example series of aggregated PHY data units that include independent data for a plurality of different client stations (e.g., STA1, STA2) and that utilizes SDM, according to another embodiment. The aggregated RTS and responsive CTSs are generally similar to the example aggregated RTS of FIG. 21, according to an embodiment.

Figure 30:
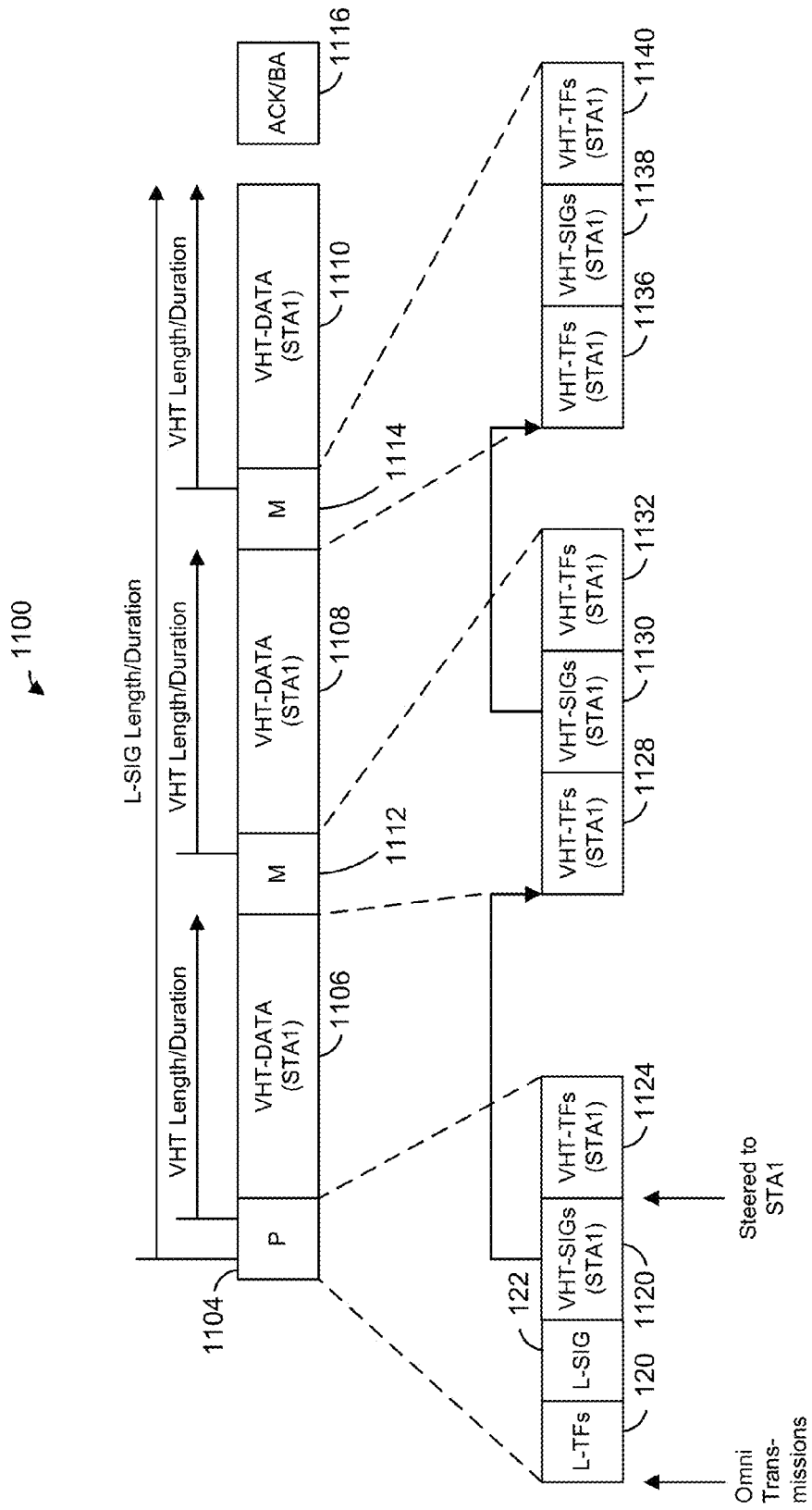
FIG. 30 is a diagram of an example single PHY data unit that includes data for a single station, according to an embodiment.

Preamble and/or midamble techniques such as described above can also be utilized in the context of transmissions to a single station. FIG. 30 is a diagram of an example single PHY data unit 1100 that includes data for STA1, according to an embodiment. The PHY data unit 1100 includes a preamble 1104 and data portions 1106, 1108, 1110 corresponding. The data portions 1106, 1108, 1110 are separated by midambles 1112, 1114. The preamble 1104, the data portions 1106, 1108, 1110, and the midambles 1112, 1114 form the single integrated PHY data unit 1100. In response to the PHY data unit 1100, STA1 transmit acknowledgement 1116. If the PHY data unit 1100 is part of a block acknowledgment (BA) session, the acknowledgment transmitted by STA1 is transmitted in response to a plurality of PHY data units including the PHY data unit 1100.

The preamble 1104 includes one or more L-TFs 120 such as an L-STF, an L-LTF, etc., and the L-SIG 122. The preamble 1104 also includes a first VHT-SIG field 1120 (VHT-SIGs (STA1)), and one or more VHT training fields (VHT-TFs (STA1)) 1124 such as a VHT-STF, a VHT-LTF, etc.

The L-TFs 120, the L-SIG 122, and the VHT-SIGs (STA1) 1120 are transmitted in an omnidirectional manner to improve chances that all stations, including STA1 and any legacy stations, receive at least the L-TFs 120 and the L-SIG 122, in at least some scenarios. The L-SIG 122 includes length and/or duration information that enables a receiving station (e.g., STA1, a legacy station, etc.) to determine the length of the PHY data unit 1100. The VHT-SIG (STA1) 1120 includes an indication of whether a midamble and another data portion follow the data portion 1106. The VHT-SIGs (STA1) 1120 includes length and/or duration information that indicates the length/duration of the portion 1106, or the portion 1106 and at least a portion of the preamble 1104 and thus enables STA1 to determine the length/duration of the portion 106 or the portion 106 and/or at least the portion of the preamble 1104. The length and/or duration information in the VHT-SIGs (STA1) 1120 also indicates a start of the midamble 1112, and thus enables STA1 to determine a start of the midamble 1112. The VHT-TFs 1124 and the data portion 1106, and the remainder of the data unit 1100 are steered to STA1 (i.e., the transmitting device applies a steering vector or matrix).

The midamble 1112 includes one or more first VHT-TFs 1128 and one or more VHT-SIGs (STA1) 1130. In one embodiment, the midamble 112 includes one or more second VHT-TFs 1132. In another embodiment, the second VHT-TFs 1132 are omitted. The VHT-SIGs (STA1) 1130 includes an indication of whether a midamble and another data portion follow the data portion 1108. The VHT-SIGs (STA1) 1130 includes length and/or duration information that indicates the length/duration of the data portion 1108, or the data portion 1108 and at least a portion of the midamble 1112 and thus enables STA1 to determine the length/duration of the data portion 108 or the data portion 108 and/or at least the portion of the midamble 1112. The length and/or duration information in the VHT-SIGs (STA1) 1130 also indicates a start of the midamble 1114, and thus enables STA1 to determine a start of the midamble 1114.

The midamble 1114 includes one or more first VHT-TFs 1138 and one or more VHT-SIGs (STA1) 1140. In one embodiment, the midamble 1114 includes one or more second VHT-TFs 1142. In another embodiment, the second VHT-TFs 1142 are omitted. The VHT-SIGs (STA1) 1140 includes an indication of whether a midamble and another data portion follow the data portion 1110. The VHT-SIGs (STA1) 1140 includes length and/or duration information that indicates the length/duration of the data portion 1110, or the payload 1110 and at least a portion of the midamble 1114 and thus enables STA1 to determine the length/duration of the data portion 1110 or the data portion 1110 and/or at least the portion of the midamble 1114. When the data portion 1110 is the last payload of the PHY data unit 1100, the length and/or duration information in the VHT-SIGs (STA1) 1140 also indicates the end of the PHY data unit 100.

In one example, length and/or duration information includes an indication of the length of data and an indication of an MCS used to transmit the data, so that the duration can be determined using the length of data and the indication of the MCS.

In some embodiments, the VHT-STF is omitted from the midambles 1112, 1114. In some embodiments, the VHT-SIGs are omitted from the midambles 1112, 1114 when all of the data portions (except the last one) have the same length, which is indicated in the VHT-SIGs of the preamble 1104. In one embodiment, VHT-TFs are omitted from the midambles 1112, 1114 when the VHT-TFs are included in the preamble 1104.

Figure 31:
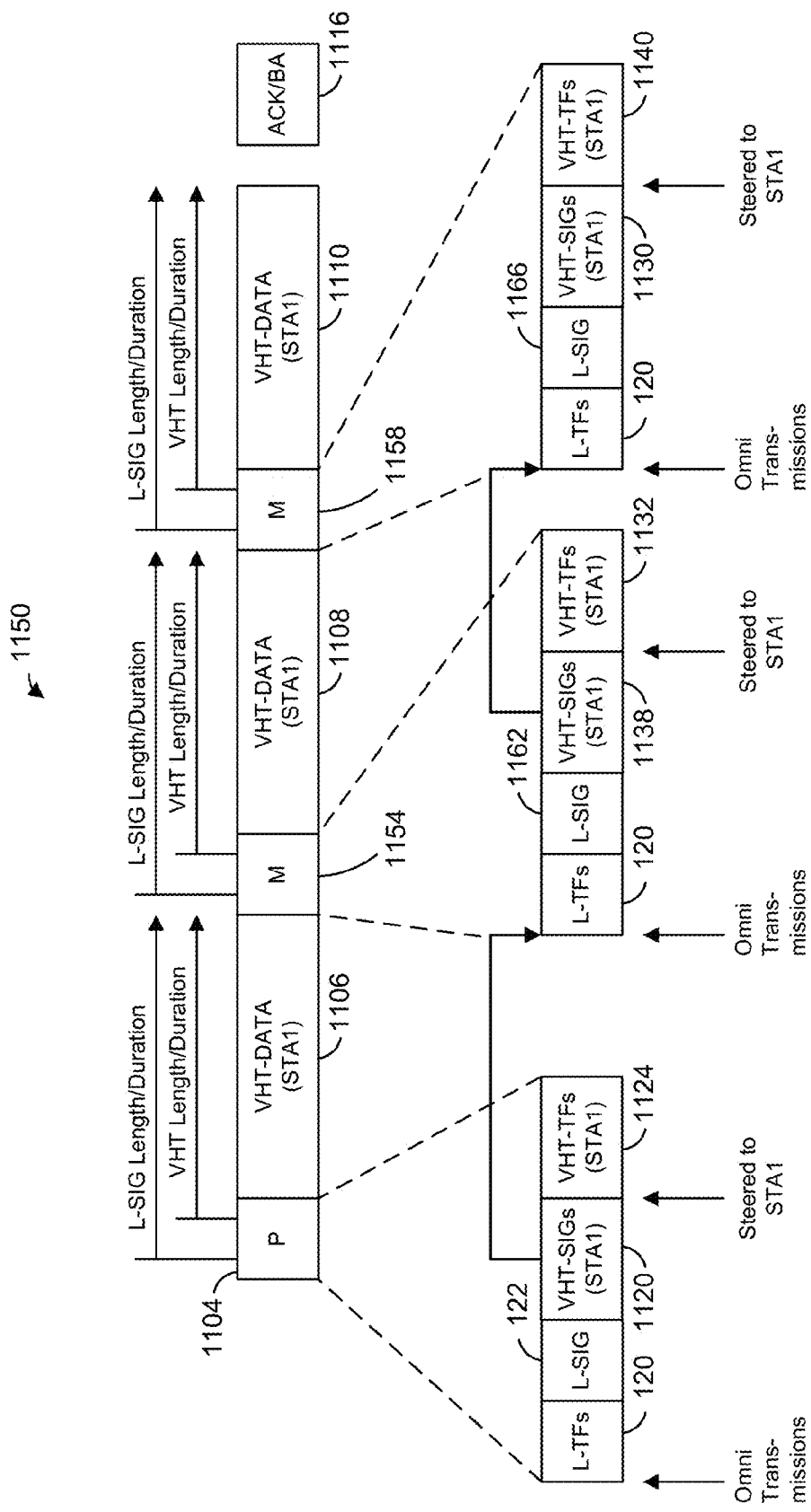
FIG. 31 is a diagram of another example single PHY data unit that includes data for single station, according to an embodiment.

FIG. 31 is a diagram of another example single PHY data unit 1150 that includes data for STA1, according to an embodiment. The single PHY data unit 1150 has a forma generally similar to the format of FIG. 30. The L-SIG 122 field of the preamble 1104, however, indicates a length/duration of the first data portion 1106, as opposed to the entire data unit 1150. Additionally, midambles 1154, 1158 have different formats as compared to the midambles of FIG. 30. Midamble 1154 includes the L-TFs 120, and an L-SIG 1162 that indicates a length/duration of the second data portion 1108. Similarly, midamble 1158 includes the L-TFs 120, and an L-SIG 1166 that indicates a length/duration of the third data portion 1110.

Figure 32:
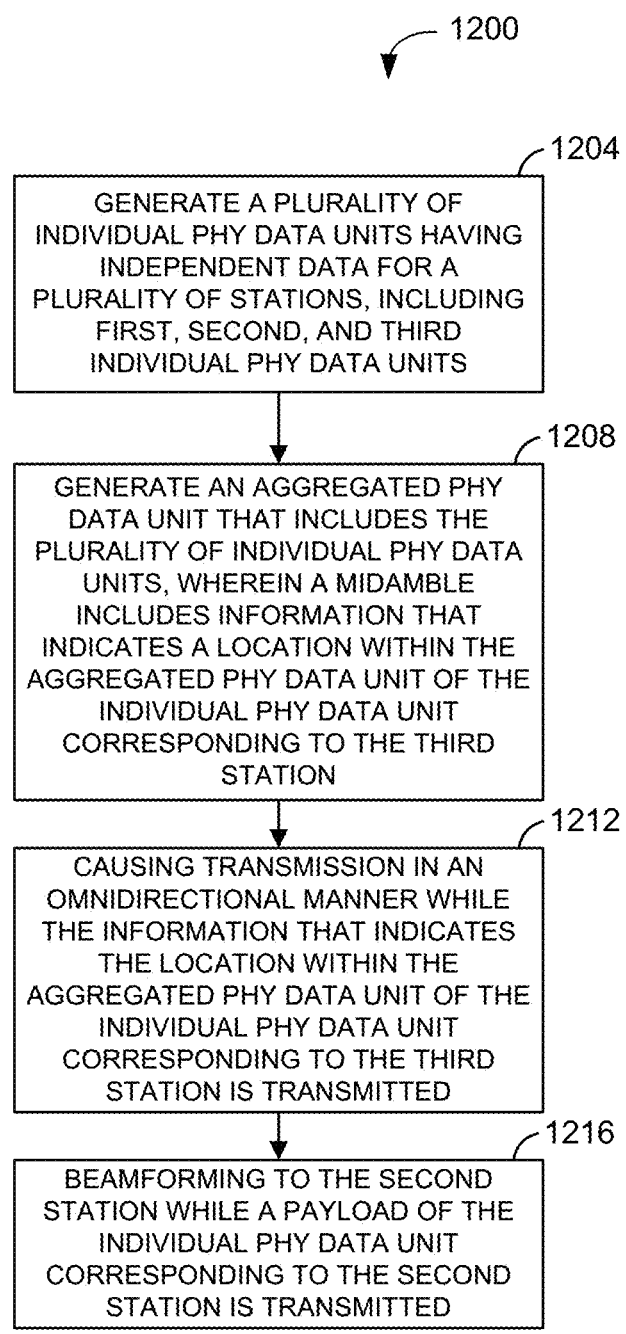
FIG. 32 is a flow diagram of an example method for generating, and controlling the transmission of, an aggregated PHY data unit, according to an embodiment.

FIG. 32 is a flow diagram of an example method 1200 for generating, and controlling the transmission of, an aggregated PHY data unit, according to an embodiment. The method 1200 is implemented by the PHY processing unit 20 (FIG. 1), in one embodiment. In other embodiments, the method 1200 is implemented by another suitable apparatus, such as another PHY processing unit.

At block 1204, a plurality of individual PHY data units are generated. The individual PHY data units have independent data for a plurality of respective stations. The plurality of respective stations includes a first station, a second station, and a third station.

At block 1208, an aggregated PHY data unit is generated, the aggregated PHY data unit including the plurality of individual PHY data units of block 1204. The aggregated PHY data unit includes at least on midamble, and this midamble includes information that indicates a location of the individual PHY data unit corresponding to the third station. In one embodiment, the PHY data unit includes a preamble, and the preamble includes information that indicates a location of the individual PHY data unit corresponding to the second station. In one embodiment, the midamble is included in the individual PHY data unit corresponding to the second station.

In one embodiment, the aggregated PHY data unit has a format such as in FIG. 9. In another embodiment, the aggregated PHY data unit has a format such as in FIG. 12.

In another embodiment, the aggregated PHY data unit has a format such as in FIG. 12. In another embodiment, the aggregated PHY data unit has another suitable format.

At block 1212, while the information that indicates the location of the individual PHY data unit corresponding to the third station is transmitted, the transmission is caused to be in an omnidirectional manner. For example, a beamforming unit is controlled to cause the omnidirectional transmission, in one embodiment.

At block 1216, while a payload of the individual PHY data unit corresponding to the second station is being transmitted, beamforming to the second station is performed.

In one embodiment, the blocks 1212 and 126 are omitted, and the method 1200 is for generating an aggregated PHY data unit. In these embodiments, the aggregated PHY data unit has a suitable format such as in FIG. 3-6, 9-13, etc.

Figure 33:
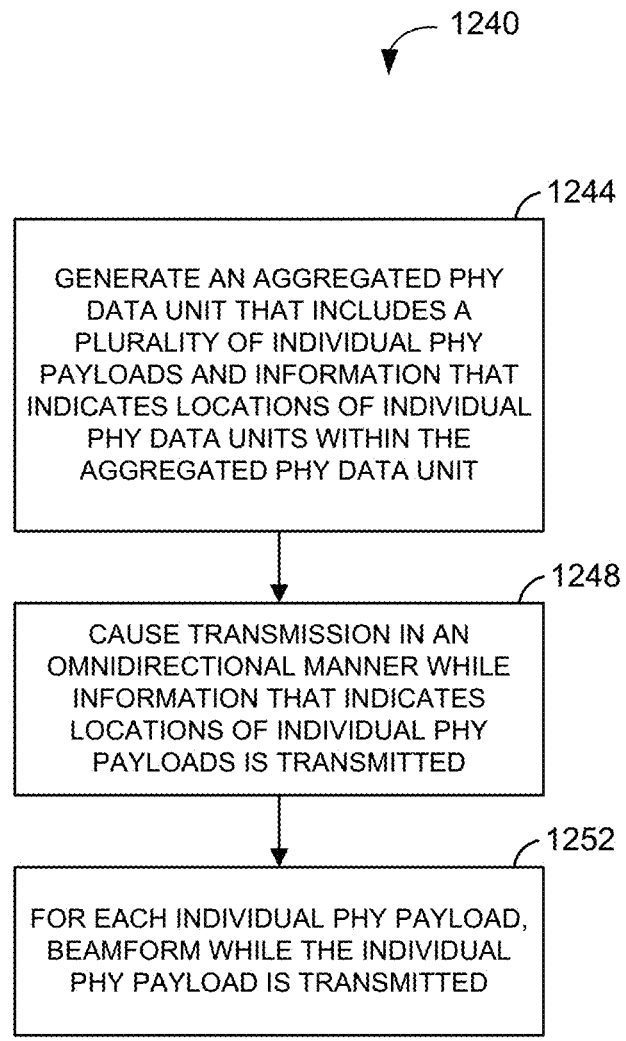
FIG. 33 is a flow diagram of another example method for generating, and controlling the transmission of, an aggregated PHY data unit, according to another embodiment.

FIG. 33 is a flow diagram of another example method 1240 for generating, and controlling the transmission of, an aggregated PHY data unit, according to another embodiment. The method 1240 is implemented by the PHY processing unit 20 (FIG. 1), in one embodiment. In other embodiments, the method 1240 is implemented by another suitable apparatus, such as another PHY processing unit.

At block 1244, an aggregated PHY data unit is generated, the aggregated PHY data unit including a plurality of individual PHY payloads. The aggregated PHY data unit includes information that indicates locations of at least some of the individual PHY payloads. In some embodiments, the aggregated PHY data unit includes a preamble. In some embodiments, the preamble includes information that indicates the locations of at least some of the individual PHY payloads. In some embodiments, the aggregated PHY data unit includes at least one midamble. In some embodiments, one or more midambles include information that indicates locations of at least some of the individual PHY payloads.

In one embodiment, the plurality of individual PHY payloads corresponds to a plurality of respective stations. In another embodiment, the plurality of individual PHY payloads corresponds to a single station.

In various embodiments, the aggregated PHY data unit has a suitable format such as described above.

In some embodiments, each of at least one of the individual PHY payloads is associated with a respective midamble of the aggregated PHY data unit. In some embodiments, the aggregated PHY data unit does not include midambles.

At block 1248, while information that indicates a location of an individual PHY data unit is transmitted, the transmission is caused to be in an omnidirectional manner. For example, a beamforming unit is controlled to cause the omnidirectional transmission, in one embodiment.

At block 1252, while a payload of the individual PHY data unit corresponding to the second station is being transmitted, beamforming is performed. For example, if the plurality of individual PHY payloads corresponds to a plurality of respective stations, beamforming is to the respective station.

In one embodiment, the blocks 1248 and 1252 are omitted, and the method 1240 is for generating an aggregated PHY data unit. In these embodiments, the aggregated PHY data unit has a suitable format such as in FIG. 3-6, 8-13, 15B, 30, etc.

Figure 34:
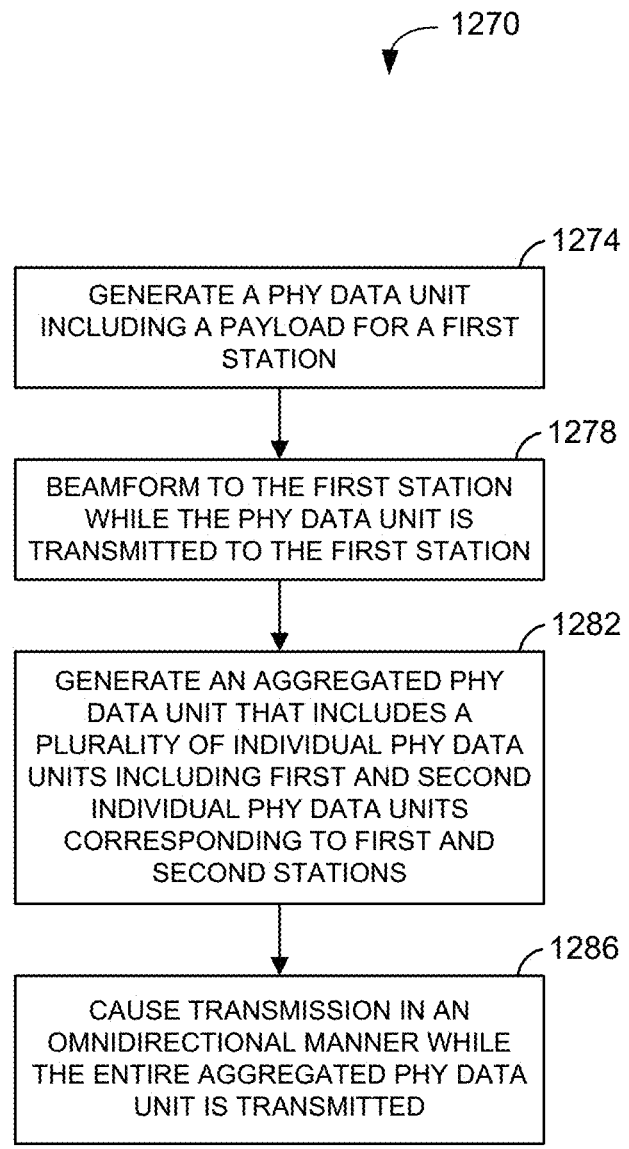
FIG. 34 is a flow diagram of another example method for generating, and controlling the transmission of, an aggregated PHY data unit, according to another embodiment.

FIG. 34 is a flow diagram of another example method 1270 for generating, and controlling the transmission of, an aggregated PHY data unit, according to another embodiment. The method 1270 is implemented by the PHY processing unit 20 (FIG. 1), in one embodiment. In other embodiments, the method 1270 is implemented by another suitable apparatus, such as another PHY processing unit.

At block 1274, a PHY data unit including a payload for a first station is generated. At block 1278, beamforming to the first station is performed while the PHY data unit generated at block 1274 is transmitted.

At block 1282, an aggregated PHY data unit is generated. The aggregated PHY data unit includes a plurality of individual PHY data units including first and second PHY data units corresponding to the first station and a second station. In some embodiments, the aggregated PHY data unit has a format such as in FIG. 10 or FIG. 11, or another suitable format.

At block 1286, transmission in an omnidirectional manner is caused while the entire aggregated PHY data unit is transmitted.

Figure 35:
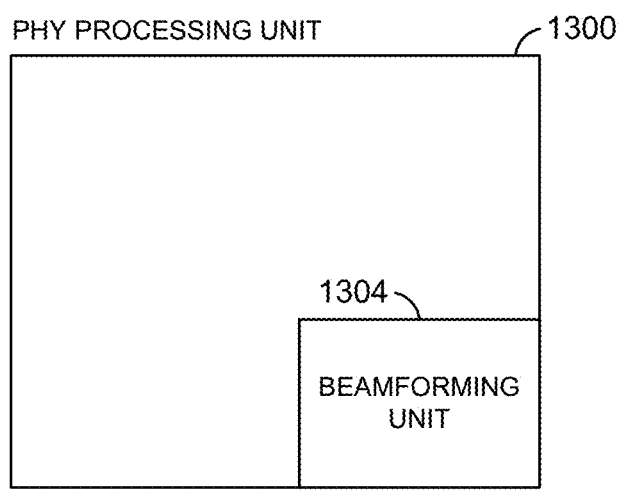
FIG. 35 is a block diagram of an example PHY processing unit that is utilized in some embodiments.

FIG. 35 is a block diagram of an example PHY processing unit 1300 that is utilized in some embodiments. In PHY processing unit 1300 includes a beamforming unit 1304.

In some embodiments, the PHY processing unit 1300 is configured to implement one or more of the methods 1200 (FIG. 32), 1240 (FIG. 33), and/or 1270 (FIG. 34).

Figure 36:
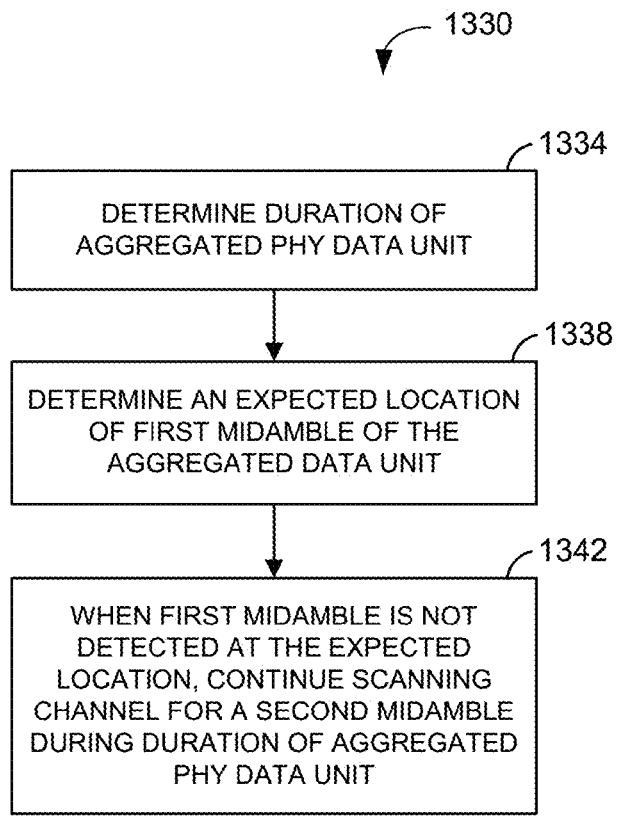
FIG. 36 is a flow diagram of an example method for processing a received aggregated PHY data unit, according to one embodiment.

FIG. 36 is a flow diagram of an example method 1330 for processing a received aggregated PHY data unit, according to one embodiment. The method 1330 is implemented by the PHY processing unit 29 (FIG. 1), in one embodiment. In other embodiments, the method 1330 is implemented by another suitable apparatus, such as the PHY processing unit 1300 of FIG. 35 or another suitable PHY processing unit.

At block 1334, a duration of the aggregated PHY data unit is determined. In one embodiment, the duration is determined based on information in a preamble of the aggregated PHY data unit.

At block 1338, an expected location of a first midamble of the aggregated PHY data unit is determined. In one embodiment, the expected location of the first midamble is determined based on information in the preamble of the aggregated PHY data unit. In another embodiment, the expected location of the first midamble is determined based on information in another midamble of the aggregated PHY data unit.

At block 1342, when the first midamble is not detected at the expected location, the communication channel is scanned for a second midamble of the aggregated PHY data unit during the duration of the PHY data unit. In some embodiments, scanning is ended prior to the end of the duration of the aggregated PHY data unit. In other embodiments, scanning is ended after the end of the duration of the aggregated PHY data unit.

Figure 37:
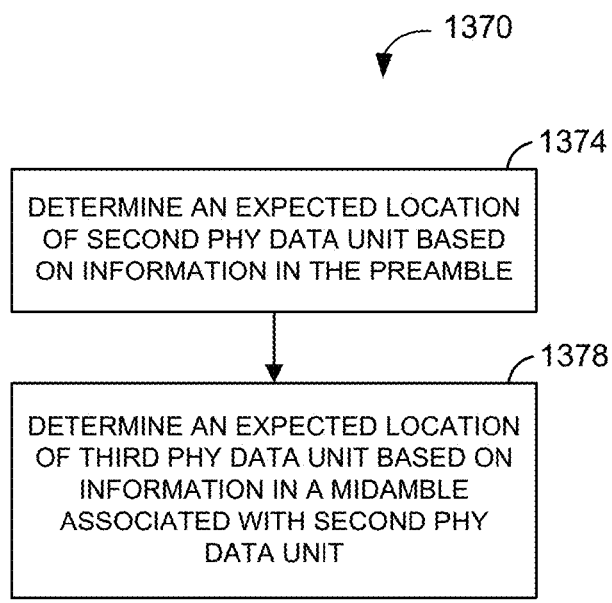
FIG. 37 is a flow diagram of another example method for processing a received aggregated PHY data unit, according to another embodiment.

FIG. 37 is a flow diagram of another example method 1370 for processing a received aggregated PHY data unit, according to another embodiment. The method 1370 is implemented by the PHY processing unit 29 (FIG. 1), in one embodiment. In other embodiments, the method 1370 is implemented by another suitable apparatus, such as the PHY processing unit 1300 of FIG. 35 or another suitable PHY processing unit.

In one embodiment, the aggregated PHY data unit includes a preamble, at least first, second, and third PHY data units, and the second PHY data unit has associated therewith a midamble of the aggregated data unit.

At block 1374, an expected location of the second individual PHY data unit of the aggregated PHY data unit is determined based on information in the preamble.

At block 1378, an expected location of the third individual PHY data unit of the aggregated PHY data unit is determined based on information in the midamble.

The IEEE 802.11n Standard defines various parameters related to the MAC layer. For example, the maximum size of a MAC service data unit (MSDU) is 2,304 bytes (B). As another example, the maximum size of an MSDU (A-MSDU) is either 3,839 B or 7,935 B. The maximum A-MSDU size is specified with a one-bit subfield in a high-throughput (HT) capabilities information element (IE).

As another example, the maximum size of a MAC protocol data unit (MPDU) in an aggregated MPDU (A-MPDU) is 4,095 B. The maximum size of an A-MPDU in an IEEE 802.11n PHY protocol data unit (PPDU) is 8,191 B to 65,535 B, and can be specified with an A-MPDU capabilities field in the HT capabilities IE.

In some embodiments, it is beneficial to use larger A-MPDU's as compared to the maximum A-MPDU size of IEEE 802.11n. For example, with communication systems having larger bandwidth than that of IEEE 802.11n, a given length PHY payload will have shorter duration, but may have the same preamble duration. Thus, there will be more preamble overhead.

In one embodiment, the maximum PPDU duration is limited by an L-SIG field in a preamble of the PPDU that indicates the number of symbols. For example, if the maximum value of this L-SIG field is 1365, and if each symbol duration is 4 microseconds (μs), the maximum PPDU duration is 5.46 milliseconds (ms). This corresponds to about 666 kilobytes (KB) for transmission at 1 Gbps, and 1.3 megabytes (MB) at 2 Gbps. If a maximum BA window is kept unchanged at 64, in order to have an A-MPDU of up to 1 MB, the maximum MPDU size should be increased to 1 MB/64=16 KB, in one embodiment. The maximum A-MSDU size should also be increased to 16 KB, in one embodiment. In one embodiment, the increased maximum MPDU size and the increased maximum A-MSDU size supports a jumbo Ethernet frame of 9000 B.

Figure 38:
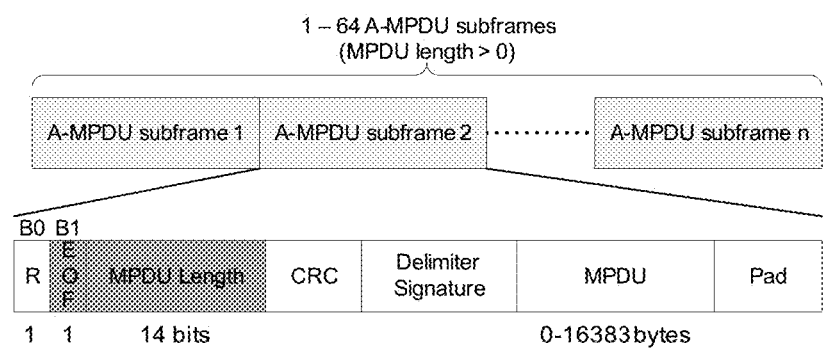
FIG. 38 is a block diagram of an example A-MPDU frame format, according to an embodiment.

FIG. 38 is a block diagram of an example A-MPDU frame format, according to an embodiment. An MPDU length field has a length of 14 bits to permit a maximum MPDU length of 16 KB. An end-of-file (EOF) is either B0 or B1, in an embodiment. In one embodiment, the CRC field is reduced to 4 bits as compared to IEEE 802.11n.

A 32-bit CRC is not effective for MPDUs longer than 12,000 B, in some embodiments and/or implementations. For example, the probability of undetected errors remains constant for frame sizes between 3007 bits and 91,639 bits (approximated 376 to 11,455 B). In one embodiment, the maximum MPDU is limited to 12 KB (or 11,455 B). In another embodiment, the maximum MPDU is limited to 8 KB, with a one bit MPDU length extension as compared to IEEE 802.11n. In one embodiment, the maximum A-MPDU size is 64*12 KB=768 KB.

In some embodiments, stations negotiate frame sizes. In one embodiment, a maximum A-MSDU length subfield is used to specify a desired length from a plurality of possible lengths. In one embodiment, the maximum A-MSDU length subfield is 2-bits (e.g., (e.g., 0: 3,839 B; 1: 7,935 B; 2: ~12 KB; or 0: 3,839 B; 1: 7,935 B; 2: ~12 KB; 3: ~16 KB). In one embodiment, a maximum A-MPDU exponent subfield is used to specify a desired length from a plurality of possible lengths. In one embodiment, the maximum A-MPDU exponent subfield is 3-bits (e.g., (213−1) B~(213+6−1) B, or (213−1) B~(213+7−1) B). In one embodiment, a maximum MSDU length subfield is used to specify a desired length from a plurality of possible lengths. In one embodiment, the maximum A-MSDU length subfield is 1-bit (e.g., 0: 2304 B; 1: ~4350 B, or 0: 2304 B; 1: ~9000 B, or 0: 2304 B; 1: suitable value above 9000 B).

In some embodiments, it is beneficial to support larger MSDUs as compared to IEEE 802.11n, for more efficient A-MSDUs and larger A-MPDUs without A-MSDU support, for example. In IEEE 802.11n, the maximum MSDU size is limited by the lowest modulation coding scheme (MCS), i.e., MCS0 (6.5 Mbps). For example, the maximum length specified by L-SIG is 5.46 ms, and the preamble overhead is ⅚ symbols. The data field of a PPDU can be a maximum of 5.44 ms. With MCS0, the maximum data field can be approximately 4420 B. Thus, the maximum MSDU (excluding a service field, a delimiter, a MAC header, a frame check sequence (FCS), PHY padding, and tail bits) is approximately 4350 B.

For jumbo Ethernet frames (9000 B), if the maximum MSDU size is increased to 9000 B, with a maximum data field of 5.44 ms, the minimum MCS that can be used is 13.5 Mbps (i.e., an MCS lower than 13.5 Mbps is not allowed to transmit a 9000 B MSDU).

In one embodiment, a transmitter determines a minimum allowed MCS based on one or more of a PPDU size, an MPDU size, or a MSDU size, and transmits the PPDU/MPDU/MSDU using an MCS that meets or exceeds the determined minimum allowed MCS. In another embodiment, a MAC processing unit is configured to fragment a long MSDU and transmit the fragmented MSDUs using a MCS lower than the determined minimum allowed MCS for the long MSDU. In another embodiment, a MAC processing unit causes a network maximum transmission unit (MTU) to be reduced (e.g., to 1500 B) in order so that a lower MCS can be utilized, e.g., when channel conditions do not support the determined minimum allowed MCS.

Figure 39:
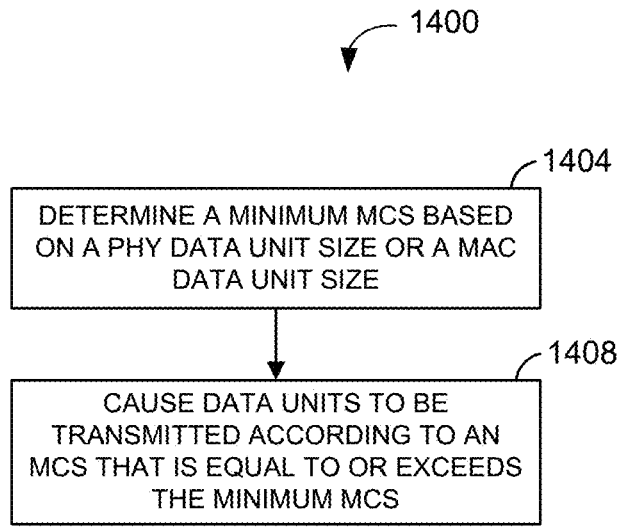
FIG. 39 is a flow diagram of an example method for controlling transmission in a wireless network, according to an embodiment.

FIG. 39 is a flow diagram of an example method 1400 for controlling transmission in a wireless network, according to an embodiment. The method 1400 is implemented by a suitable PHY processing unit such as the PHY processing unit 20 (FIG. 1), the PHY processing unit 29 (FIG. 1), the PHY processing unit 1300 (FIG. 35), etc.

At block 1404, a minimum MCS is determined based on a PHY data unit size or a MAC data unit size. In one embodiment, the minimum MCS is determined based on a PPDU size. In another embodiment, the minimum MCS is determined based on a MPDU size. In another embodiment, the minimum MCS is determined based on a MSDU size.

At block 1408, data units are caused to be transmitted according to an MCS that is equal to or exceeds the minimum MCS determined at block 1404. In one embodiment, an MCS that is equal to or exceeds the minimum MCS is an MCS that provides a throughput equal to or greater than a throughput provided by the minimum MCS. In another embodiment, an MCS that is equal to or exceeds the minimum MCS is an MCS that provides an effective data rate equal to or greater than an effective data rate provided by the minimum MCS.

Figure 40:
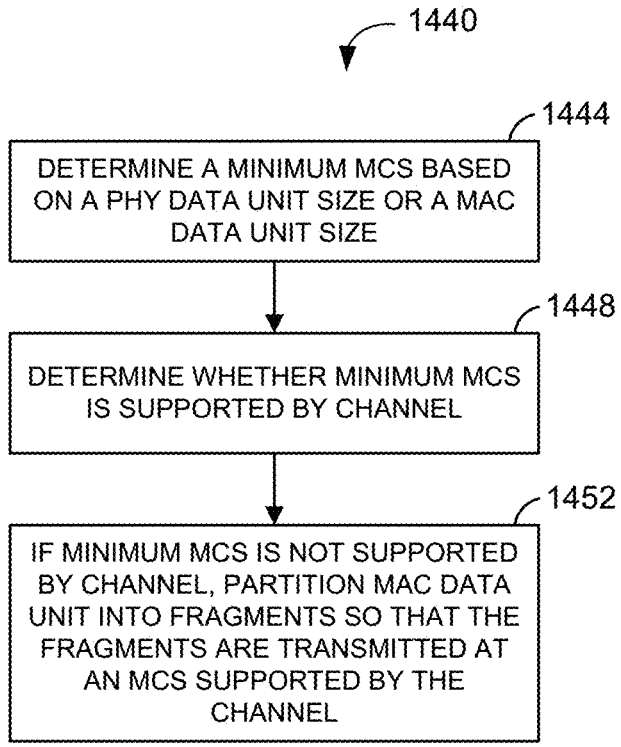
FIG. 40 is a flow diagram of another example method for controlling transmission in a wireless network, according to another embodiment.

FIG. 40 is a flow diagram of another example method 1440 for controlling transmission in a wireless network, according to another embodiment. The method 1440 is implemented by a suitable MAC processing unit such as the MAC processing unit 18 (FIG. 1), the MAC processing unit 28 (FIG. 1), etc.

At block 1444, a minimum MCS is determined based on a PHY data unit size or a MAC data unit size. In one embodiment, the minimum MCS is determined based on a PPDU size. In another embodiment, the minimum MCS is determined based on a MPDU size. In another embodiment, the minimum MCS is determined based on a MSDU size.

At block 1448, it is determined whether the minimum MCS determined at block 1444 is supported by the communication channel. In one embodiment, a PHY processing unit determines a maximum MCS supported by the channel and informs the MAC processing unit, and the MAC processing unit determines whether the minimum MCS determined at block 1444 is supported by the communication channel based on the maximum MCS supported by the channel as determined by the PHY processing unit.

At block 1452, if it is determined that the minimum MCS determined at block 1444 is not supported by the channel, a MAC data unit is fragmented into smaller fragments so that transmission of the fragments are supported by the channel. For example, in one embodiment, a long MSDU is fragmented into smaller MSDUs.

Figure 41:
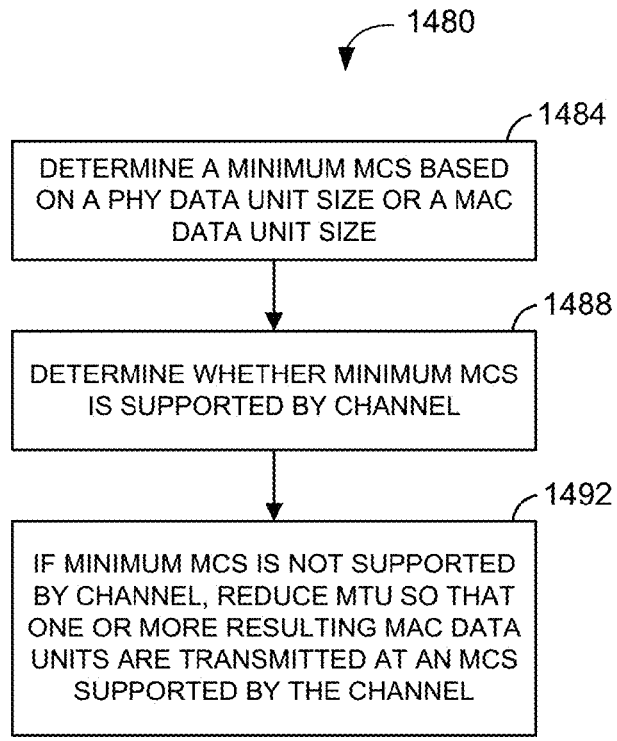
FIG. 41 is a flow diagram of another example method for controlling transmission in a wireless network, according to another embodiment.

FIG. 41 is a flow diagram of another example method 1480 for controlling transmission in a wireless network, according to another embodiment. The method 1480 is implemented by a suitable MAC processing unit such as the MAC processing unit 18 (FIG. 1), the MAC processing unit 28 (FIG. 1), etc.

At block 1484, a minimum MCS is determined based on a PHY data unit size or a MAC data unit size. In one embodiment, the minimum MCS is determined based on a PPDU size. In another embodiment, the minimum MCS is determined based on a MPDU size. In another embodiment, the minimum MCS is determined based on a MSDU size.

At block 1488, it is determined whether the minimum MCS determined at block 1444 is supported by the communication channel. In one embodiment, a PHY processing unit determines a maximum MCS supported by the channel and informs the MAC processing unit, and the MAC processing unit determines whether the minimum MCS determined at block 1444 is supported by the communication channel based on the maximum MCS supported by the channel as determined by the PHY processing unit.

At block 1492, if it is determined that the minimum MCS determined at block 1444 is not supported by the channel, a network MTU size is reduced so that resulting MAC data units are supported by the channel. For example, in one embodiment, a MTU size greater than 1500 B (e.g., 9000 B) is reduced to 1500 B or less. In one embodiment, the MAC processing unit sends a signal to a processor that implements a protocol level higher than MAC to reduce the MTU, e.g., an Ethernet MTU.

In some embodiments, the method 1400 (FIG. 39) is combined with the method 1440 (FIG. 40) or the method 1480 (FIG. 41). For example, if it is determined that the minimum MCS is supported by the communication channel, block 1408 is implemented. On the other hand, if it is determined that the minimum MCS is not supported by the communication channel, block 1452 or block 1492 is implemented.

In IEEE 802.11n, stations can negotiate buffer size (i.e., number of buffers) when setting a BA agreement per traffic identifier (TID). A station capable of supporting a maximum MSDU/A-MSDU, but with limited buffer space must request a small buffer size (i.e., much less than 64) for each BA/TID session. A small buffer size leads to a small BA window, which reduces MAC efficiency for an A-MPDU with small size MPDUs. It is beneficial, in some embodiments and/or scenarios, to negotiate both a buffer size (i.e., a number of buffers) and a maximum MPDU size per BA/TID.

Figure 42:
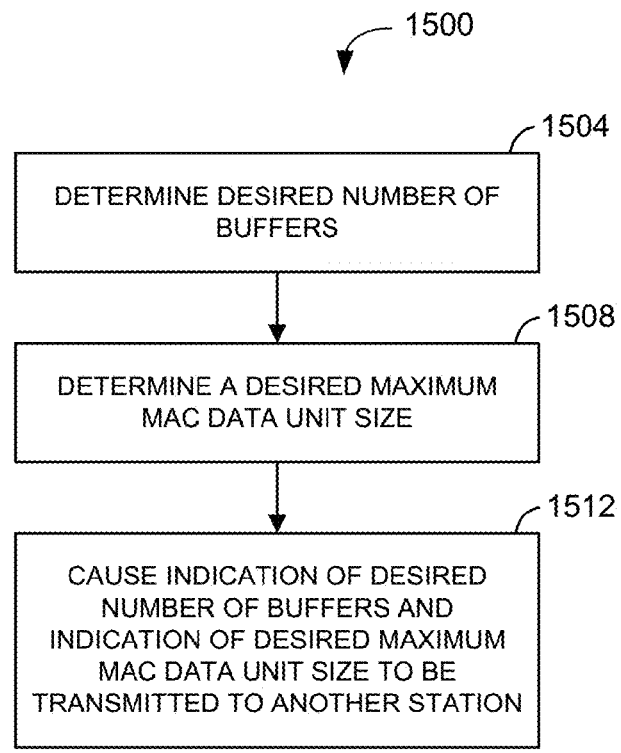
FIG. 42 is a flow diagram of an example method for controlling transmission in a wireless network, according to an embodiment.

FIG. 42 is a flow diagram of an example method 1500 for controlling transmission in a wireless network, according to an embodiment. The method 1500 is implemented by a suitable MAC processing unit such as the MAC processing unit 18 (FIG. 1), the MAC processing unit 28 (FIG. 1), etc. The method 1500 is utilized for negotiating a buffer size and a maximum MAC data unit size for a particular BA session and/or a particular TID, according to an embodiment.

At block 1504, a desired buffer size (i.e., a number of buffers) for a particular BA session and/or a particular TID is determined. At block 1508, a desired maximum MAC data unit size (e.g., a maximum MPDU size) for the particular BA session and/or the particular TID is determined. At block 1512, indications of the desired buffer size and the desired maximum MAC data unit size are caused to be transmitted to another station with which the BA/TID session is to be performed. In one embodiment, block 1512 comprises including the indications in a single MAC IE. In another embodiment, each indication is included in a separate MAC IE. In one embodiment, an indication of the maximum MAC data unit size is included in an add BA parameter set field of an extended add BA request frame. In one embodiment, the indication of the maximum MAC data unit size is a 2-bit field (e.g., 0: 2 KB; 1: 4 KB; 2: 8 KB; 3: 12 KB, or 0: 2 KB; 1: 4 KB; 2: 8 KB; 3: 16 KB).

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    determining, at a first communication device, a desired number of buffers to be used in a block acknowledgment (BA) session or with media access control (MAC) data units having a same traffic identifier (TID);
    determining, at the first communication device, a desired maximum MAC protocol data unit (MPDU) size for each MPDU to be used in the BA session or with the MAC data units having the same TID, wherein the first communication device is configured to aggregate multiple MPDUs into an aggregate MPDU (A-MPDU);
    causing, at the first communication device, an indication of the desired number of buffers in the BA session or with the MAC data units having the same TID to be transmitted to a second communication device in a wireless communication network for negotiating with the second communication device; and
    causing, at the first communication device, an indication of the desired maximum MPDU size for each MPDU to be used in the BA session or with the MAC data units having the same TID to be transmitted to the second communication device for negotiating with the second communication device.

2. The method of claim 1, wherein:
    the desired number of buffers is for a BA session associated with the same TID;
    the desired maximum MPDU size is for the BA session associated with the same TID;
    causing the indication of the desired number of buffers to be transmitted to the second communication device as part of a negotiation of the BA session with the second communication device; and
    causing the indication of the desired maximum MPDU size to be transmitted to the second communication device as part of the negotiation of the BA session with the second communication device.

3. The method of claim 2, wherein causing the indication of the desired maximum MPDU size to be transmitted to the second communication device comprises including, at the first communication device, the indication of the desired maximum MPDU size in an extended BA parameter set field in an extended add BA request frame.

4. The method of claim 2, wherein causing the indication of the desired number of buffers to be transmitted to the second communication device and causing the indication of the desired maximum MPDU size to be transmitted to the second communication device comprises including, at the first communication device, the indication of the desired number of buffers and the indication of the desired maximum MPDU size in a single MAC information element.

5. An apparatus, comprising:
    a network interface device including
        a media access control (MAC) processing unit configured to
            determine a desired number of buffers to be used in a block acknowledgment (BA) session or with MAC data units having a same traffic identifier (TID),
            determine a desired maximum MAC protocol data unit (MPDU) size for each MPDU to be used in the BA session or with the MAC data units having the same TID,
            aggregate multiple MPDUs into an aggregate MPDU (A-MPDU),
            cause an indication of the desired number of buffers in the BA session or with the MAC data units having the same TID to be transmitted to another station in a wireless communication network for negotiating with the other station, and
            cause an indication of the desired maximum MPDU size for each MPDU to be used in the BA session or with the MAC data units having the same TID to be transmitted to the other station for negotiating with the other station.

6. The apparatus of claim 5, wherein:
    the desired number of buffers is for a BA session associated with the same TID;
    the desired maximum MPDU size is for the BA session associated with the same TID;
    the indication of the desired number of buffers is for use in negotiating the BA session with the other station; and
    the indication of the desired maximum MPDU size is for use in negotiating the BA session with the other station.

7. The apparatus of claim 5, wherein the MAC processing unit is configured to include the indication of the desired maximum MPDU size in an extended BA parameter set field in an extended add BA request frame.

8. The apparatus of claim 5, wherein the MAC processing unit is configured to include the indication of the desired number of buffers and the indication of the desired maximum MPDU size in a single MAC information element.

9. The apparatus of claim 5, wherein the network interface device further includes a physical layer (PHY) processing unit configured to generate a PHY protocol data unit (PPDU) that includes the indication of the desired maximum MPDU size to be used in the BA session or with the MAC data units having the same TID.

10. The apparatus of claim 9, wherein the network interface device further includes one or more transceivers.

11. The apparatus of claim 5, wherein the network interface device comprises:
    a memory device; and
    a processor coupled to the memory device, wherein the processor is configured to execute machine readable instructions stored in the memory device,
    wherein the machine readable instructions, when executed by the processor, cause the processor to
        cause the indication of the desired number of buffers in the BA session or with the MAC data units having the same TID to be transmitted to the other station, and
        cause the indication of the desired maximum MPDU size to be used in the BA session or with the MAC data units having the same TID to be transmitted to the other station.

12. The apparatus of claim 11, wherein the machine readable instructions, when executed by the processor, further cause the processor to:
    determine the desired number of buffers to be used in the BA session or with MAC data units having the same TID, and
    determine the desired maximum MPDU size to be used in the BA session or with MAC data units having the same TID.

13. A non-transitory, tangible medium or media storing machine readable instructions that, when executed by a processor, cause the processor to:

determine a desired number of buffers to be used in a block acknowledgment (BA) session or with MAC data units having a same traffic identifier (TID);

determine a desired maximum MAC protocol data unit (MPDU) size for each MPDU to be used in the BA session or with the MAC data units having the same TID;

aggregate multiple MPDUs into an aggregate MPDU (A-MPDU);

cause an indication of the desired number of buffers in the BA session or with the MAC data units having the same TID to be transmitted to another station in a wireless communication network for negotiating with the other station; and cause an indication of the desired maximum MPDU size for each MPDU to be used in the BA session or with the MAC data units having the same TID to be transmitted to the other station for negotiating with the other station.

14. The non-transitory, tangible medium or media of claim 13, wherein:

the desired number of buffers is for a BA session associated with the same TID;

the desired maximum MPDU size is for the BA session associated with the same TID;

the indication of the desired number of buffers is for use in negotiating the BA session with the other station; and the indication of the desired maximum MPDU size is for use in negotiating the BA session with the other station.

15. The non-transitory, tangible medium or media of claim 13, storing further instructions that, when executed by the processor, cause the processor to include the indication of the desired maximum MPDU size in an extended BA parameter set field in an extended add BA request frame.

16. The non-transitory, tangible medium or media of claim 13, storing further instructions that, when executed by the processor, cause the processor to include the indication of the desired number of buffers and the indication of the desired maximum MPDU size in a single MAC information element.

\* \* \* \* \*